US012691452B2

(12) United States Patent
Xue et al.

(10) Patent No.: US 12,691,452 B2
(45) Date of Patent: Jul. 28, 2026

(54) DEVICES FOR IMPROVING SAMPLE PREPARATION AND PROCESSING

(71) Applicant: ILLUMINA, INC., San Diego, CA (US)

(72) Inventors: Yi Xue, Shrewsbury, MA (US); Huicheng Wang, Watertown, MA (US); Sepehr Kiani, Watertown, MA (US); Corey Alicchio, Watertown, MA (US)

(73) Assignee: Illumina, Inc., San Diego, CA (US)

( * ) Notice: Subject to any disclaimer, the term of this patent is extended or adjusted under 35 U.S.C. 154(b) by 676 days.

(21) Appl. No.: 17/979,977

(22) Filed: Nov. 3, 2022

(65) Prior Publication Data

US 2023/0136755 A1 May 4, 2023

Related U.S. Application Data

(60) Provisional application No. 63/275,152, filed on Nov. 3, 2021.

(51) Int. Cl.

| | |
|---|---|
| ***B04B 5/00*** | (2006.01) |
| ***B01F 31/20*** | (2022.01) |
| ***B01L 9/06*** | (2006.01) |
| *B01F 101/23* | (2022.01) |

(52) U.S. Cl.

CPC .............. *B01L 9/06* (2013.01); *B01F 31/201* (2022.01); *B01F 2101/23* (2022.01); *B01L 2200/025* (2013.01); *B01L 2200/08* (2013.01)

(58) Field of Classification Search

None

See application file for complete search history.

(56) References Cited

U.S. PATENT DOCUMENTS 4,202,634 A 5/1980 Kraft et al.
4,305,668 A 12/1981 Bilbrey
4,553,955 A * 11/1985 Lam ...................... B04B 5/0414 494/16

(Continued)

FOREIGN PATENT DOCUMENTS

AU 2013203624 A1 5/2013
CN 112410213 A 2/2021

(Continued)

OTHER PUBLICATIONS

International Search Report and Written Opinion for International Application No. PCT/US2022/048785, Mar. 17, 2023, 9 pages.

(Continued)

*Primary Examiner* — Paul S Hyun

(74) *Attorney, Agent, or Firm* — Illumina, Inc.

(57) ABSTRACT

The invention provides devices for improving assay protocol compliance, reproducibility, and sensitivity. In particular, the devices of the present invention are tailored to certain single-cell sequencing assays, including single-cell RNA sequencing assays that utilize pre-templated instant partitions (PIPs) templates, wherein such devices hold tubes stationary while performing sample preparation, provide reproducible volume removal from tubes, allow for improved magnetic separation of analytes from buffers, and provide reproducible centrifugation of tubes.

20 Claims, 12 Drawing Sheets

(56) References Cited

U.S. PATENT DOCUMENTS 4,701,415 A 10/1987 Dutton et al.
4,883,644 A 11/1989 Perlman
5,036,989 A 8/1991 Carilli
5,512,439 A 4/1996 Hornes et al.
5,632,388 A 5/1997 Morrison et al.
5,813,759 A 9/1998 Gebrian
6,186,657 B1 2/2001 Fuchsbichler
6,210,891 B1 4/2001 Nyren et al.
6,306,597 B1 10/2001 Macevicz
6,309,833 B1 10/2001 Edman et al.
6,828,100 B1 12/2004 Ronaghi
6,833,246 B2 12/2004 Balasubramanian
6,911,345 B2 6/2005 Quake et al.
7,232,656 B2 6/2007 Balasubramanian et al.
7,296,924 B2 11/2007 Czarnek
7,339,671 B2 3/2008 Peng
7,361,472 B2 4/2008 Yguerabide et al.
7,537,897 B2 5/2009 Brenner et al.
7,598,035 B2 10/2009 Macevicz
7,835,871 B2 11/2010 Kain et al.
7,842,457 B2 11/2010 Berka et al.
7,960,120 B2 6/2011 Rigatti et al.
8,012,690 B2 9/2011 Berka et al.
8,629,323 B2 1/2014 Weeks et al.
8,715,934 B2 5/2014 Diehl et al.
8,748,102 B2 6/2014 Berka et al.
8,765,380 B2 7/2014 Berka et al.
9,011,777 B2 4/2015 Beer
9,012,390 B2 4/2015 Holtze et al.
9,085,798 B2 7/2015 Chee
9,260,751 B2 2/2016 Diehl et al.
9,388,465 B2 7/2016 Hindson et al.
9,399,797 B2 7/2016 Hutchison et al.
9,562,837 B2 2/2017 Link
9,567,645 B2 2/2017 Fan et al.
9,567,646 B2 2/2017 Fan et al.
9,580,736 B2 2/2017 Tan et al.
9,598,736 B2 3/2017 Fan et al.
9,637,799 B2 5/2017 Fan et al.
9,650,629 B2 5/2017 Froehlich et al.
9,695,392 B2 7/2017 Sherman et al.
9,695,474 B2 7/2017 Johnson et al.
9,701,998 B2 7/2017 Hindson et al.
9,708,654 B2 7/2017 Hunicke-Smith et al.
9,783,847 B2 10/2017 Chee
9,951,386 B2 4/2018 Hindson et al.
10,030,267 B2 7/2018 Hindson et al.
10,041,116 B2 8/2018 Hindson et al.
10,131,958 B1 11/2018 Fan et al.
10,151,003 B2 12/2018 Fan et al.
10,155,981 B2 12/2018 Brenner et al.
10,202,628 B2 2/2019 Church et al.
10,208,356 B1 2/2019 Fan et al.
10,221,442 B2 3/2019 Hindson et al.
10,240,192 B2 3/2019 Berka et al.
10,240,197 B1 3/2019 Brenner et al.
10,253,375 B1 4/2019 Fan et al.
10,266,883 B2 4/2019 Chee
10,280,459 B1 5/2019 Brenner et al.
10,285,940 B2 5/2019 Mason et al.
10,329,557 B2 6/2019 Johnson et al.
10,344,329 B2 7/2019 Hindson et al.
10,392,662 B1 8/2019 Brenner et al.
10,400,280 B2 9/2019 Hindson et al.
10,415,030 B2 9/2019 Marshall et al.
10,457,986 B2 10/2019 Hindson et al.
10,501,793 B2 12/2019 Chee
10,533,950 B2 1/2020 Herzog et al.
10,584,381 B2 3/2020 Hindson et al.
10,739,236 B1 8/2020 Hopkins
11,008,607 B2 5/2021 Chee
11,060,149 B2 7/2021 Steelman
11,104,961 B2 8/2021 Fontanez et al.
11,142,791 B2 10/2021 Abate et al.
11,549,138 B2 1/2023 Chee
11,692,214 B2 7/2023 Nolan
11,932,902 B2 3/2024 Nolan
12,234,505 B2 2/2025 Chee
12,275,993 B2 4/2025 Ziraldo et al.
12,297,487 B2 5/2025 Chee
12,305,239 B2 5/2025 Ziraldo et al.
12,416,102 B2 9/2025 Ziraldo et al.
2002/0132251 A1 9/2002 Shuber
2003/0143599 A1 7/2003 Makarov et al.
2003/0180737 A1 9/2003 Gu et al.
2004/0005585 A1 1/2004 Bi et al.
2005/0051466 A1 3/2005 Carter et al.
2006/0024681 A1 2/2006 Smith et al.
2006/0177836 A1 8/2006 McKernan et al.
2006/0177936 A1* 8/2006 Shneider .................. B01L 9/06 436/45
2006/0292611 A1 12/2006 Berka et al.
2007/0080316 A1 4/2007 Sauer et al.
2007/0114362 A1 5/2007 Feng et al.
2008/0004436 A1 1/2008 Tawfik et al.
2008/0056059 A1 3/2008 Manera et al.
2009/0238727 A1 9/2009 Sinclair et al.
2009/0280475 A1 11/2009 Pollack et al.
2011/0009278 A1 1/2011 Kain et al.
2011/0086780 A1 4/2011 Colston, Jr. et al.
2011/0118151 A1 5/2011 Eshoo et al.
2011/0176976 A1 7/2011 Ebi et al.
2011/0311978 A1 12/2011 Makarewicz, Jr. et al.
2012/0180941 A1 7/2012 Piramoon et al.
2012/0295269 A1 11/2012 Pourahmadi et al.
2012/0316074 A1 12/2012 Saxonov
2013/0115169 A1 5/2013 Lahann et al.
2014/0024020 A1 1/2014 Tanabe
2014/0155295 A1 6/2014 Hindson et al.
2014/0293735 A1 10/2014 Vidakovic et al.
2014/0309795 A1 10/2014 Norton et al.
2015/0133312 A1 5/2015 Bielas et al.
2015/0225777 A1 8/2015 Hindson et al.
2015/0232942 A1 8/2015 Abate et al.
2016/0121325 A1 5/2016 Masquelier et al.
2016/0186267 A1 6/2016 So et al.
2016/0250608 A1 9/2016 Anders et al.
2016/0266015 A1 9/2016 Loo et al.
2016/0274103 A1 9/2016 Piloto et al.
2017/0073280 A1 3/2017 Jones
2017/0153248 A1 6/2017 Goix et al.
2017/0165670 A1 6/2017 Harder et al.
2017/0189909 A1 7/2017 Lee et al.
2017/0192030 A1 7/2017 Lapham et al.
2017/0218437 A1 8/2017 Seul et al.
2017/0232417 A1 8/2017 Lebofsky et al.
2017/0255160 A1 9/2017 Numata et al.
2017/0269112 A1 9/2017 Gerstel
2018/0010105 A1 1/2018 Rogers et al.
2018/0051321 A1 2/2018 Hindson et al.
2018/0119216 A1 5/2018 Jamshidi et al.
2018/0133715 A1 5/2018 Craig et al.
2018/0179553 A1 6/2018 Watson et al.
2018/0216162 A1 8/2018 Belhocine et al.
2018/0237836 A1 8/2018 Abate et al.
2018/0274027 A1 9/2018 Hindson et al.
2018/0340880 A1 11/2018 Matsumoto et al.
2018/0355407 A1 12/2018 Utharala et al.
2019/0030539 A1 1/2019 Vermaas et al.
2019/0039034 A1 2/2019 Siow et al.
2019/0085412 A1 3/2019 Fan et al.
2019/0153532 A1 5/2019 Bharadwaj et al.
2019/0153550 A1 5/2019 Steinmetzer et al.
2019/0177789 A1 6/2019 Hindson et al.
2019/0323003 A1 10/2019 Ramji et al.
2019/0323091 A1 10/2019 Bramlett et al.
2019/0352714 A1 11/2019 Salk et al.
2019/0381497 A1 12/2019 Di Carlo et al.
2019/0382753 A1 12/2019 Steemers et al.
2020/0040385 A1 2/2020 Beechem et al.
2020/0061618 A1 2/2020 Lee et al.
2020/0080112 A1 3/2020 Zhang et al.
2020/0190513 A1 6/2020 Fernandez et al.
2020/0261879 A1 8/2020 Abate et al.

(56) References Cited

U.S. PATENT DOCUMENTS

| | | | |
|---|---|---|---|
| 2020/0324287 | A1 | 10/2020 | Vijayan et al. |
| 2020/0376488 | A1 | 12/2020 | Wu et al. |
| 2021/0010070 | A1 | 1/2021 | Schnall-Levin et al. |
| 2021/0054369 | A1 | 2/2021 | Meltzer et al. |
| 2021/0214721 | A1 | 7/2021 | Fontanez et al. |
| 2021/0214763 | A1 | 7/2021 | Fontanez et al. |
| 2021/0214769 | A1 | 7/2021 | Fontanez et al. |
| 2021/0214792 | A1 | 7/2021 | Fontanez et al. |
| 2021/0214802 | A1 | 7/2021 | Fontanez et al. |
| 2021/0215591 | A1 | 7/2021 | Fontanez et al. |
| 2021/0291185 | A1 | 9/2021 | Lee et al. |
| 2021/0301354 | A1 | 9/2021 | Kiani |
| 2021/0308691 | A1 | 10/2021 | Horak |
| 2021/0332432 | A1 | 10/2021 | Kiani |
| 2021/0340596 | A1 | 11/2021 | Meltzer et al. |
| 2021/0381064 | A1 | 12/2021 | Fontanez et al. |
| 2022/0017892 | A1 | 1/2022 | Meltzer et al. |
| 2022/0135966 | A1 | 5/2022 | Meltzer |
| 2022/0136071 | A1 | 5/2022 | Meltzer |
| 2022/0143615 | A1 | 5/2022 | Medoro |
| 2022/0154248 | A1 | 5/2022 | Abate et al. |
| 2022/0234043 | A1 | 7/2022 | Tanabe et al. |
| 2022/0235416 | A1 | 7/2022 | Fontanez et al. |
| 2022/0267761 | A1 | 8/2022 | Fontanez et al. |

FOREIGN PATENT DOCUMENTS

| | | | |
|---|---|---|---|
| CN | 113274927 | A | 8/2021 |
| EP | 1441225 | A1 | 7/2004 |
| EP | 1767275 | A1 * | 3/2007 |
| EP | 1839756 | A1 | 10/2007 |
| EP | 1877170 | B1 | 6/2010 |
| EP | 3819637 | A1 | 5/2021 |
| JP | 2003080115 | A | 3/2003 |
| WO | WO-9708547 | A1 | 3/1997 |
| WO | WO-2009114619 | A1 | 9/2009 |
| WO | WO-2010117620 | A2 | 10/2010 |
| WO | WO-2011156084 | A1 | 12/2011 |
| WO | WO-2012116146 | A1 | 8/2012 |
| WO | WO-2014100434 | A1 | 6/2014 |
| WO | WO-2014146025 | A1 | 9/2014 |
| WO | WO-2014153071 | A1 | 9/2014 |
| WO | WO-2015157369 | A1 | 10/2015 |
| WO | WO-2015187792 | A1 | 12/2015 |
| WO | WO-2016025815 | A1 | 2/2016 |
| WO | WO-2016040476 | A1 | 3/2016 |
| WO | WO-2016126871 | A2 | 8/2016 |
| WO | WO-2016138080 | A1 | 9/2016 |
| WO | WO-2016172373 | A1 | 10/2016 |
| WO | WO-2017161306 | A1 | 9/2017 |
| WO | WO-2017201451 | A1 | 11/2017 |
| WO | WO-2019011971 | A1 | 1/2019 |
| WO | WO-2019023627 | A1 | 1/2019 |
| WO | WO-2019050840 | A1 | 3/2019 |
| WO | WO-2019204229 | A1 | 10/2019 |
| WO | WO-2019217552 | A1 | 11/2019 |
| WO | WO-2019222523 | A2 | 11/2019 |
| WO | WO-2020037214 | A1 | 2/2020 |
| WO | WO-2020069268 | A1 | 4/2020 |
| WO | WO-2020156879 | A1 | 8/2020 |

OTHER PUBLICATIONS

Berensmeier S., "Magnetic Particles for the Separation and Purification of Nucleic Acids", Applied Microbiology and Biotechnology, Dec. 2006, vol. 73, pp. 495-504.

BIOCOMPARE: "How to Maintain a Constant Temp in Your CO2 Incubator", Jan. 17, 2013, 7 Pages.

Bowman S.K., et al., "Multiplexed Illumina Sequencing Libraries from Picogram Quantities of DNA", BMC Genomics, vol. 14, No. 466, Jul. 9, 2013, 8 Pages.

Brouzes E., et al., "Droplet Microfluidic Technology for Single-cell High-throughput Screening", Proceedings of the National Academy of Sciences of the United States of America, vol. 106, No. 34, Aug. 25, 2009, pp. 14195-14200.

Cai B., et al., "Selection of DNA-Encoded Libraries to Protein Targets within and on Living Cells", Journal of the American Chemical Society, Oct. 15, 2019, vol. 141, No. 43, pp. 17057-17061, XP093025492, DOI: 10.1021/jacs.9b08085.

Cheng W-C., et al., "Ultra-senstive And Rapid Detection of Nucleic Acids and Microorganisms in Body Fluids Using Single-molecule Tethering", Nature Communications, vol. 11, No. 1, Sep. 22, 2020, pp. 1-9.

Datlinger P., et al., "Pooled CRISPR Screening with Single-Cell Transcriptome Readout", Author Manuscript, Nature Methods, Mar. 2017, vol. 14, No. 3, pp. 297-301, 20 Pages.

Eastburn D.J., et al., "Ultrahigh-throughput Mammalian Single-cell Reverse-transcriptase Polymerase Chain Reaction in Microfluidic Drops", Analytical Chemistry, vol. 85, Aug. 20, 2013, pp. 8016-8021.

Fan J., "Barcode Doublets", JEFWorks Lab, 2017, pp. 1-5.

Figueiredo A., et al., "Cost Effective Method for Construction of High Quality cDNA Libraries", Biomolecular Engineering, Oct. 2007, vol. 24, pp. 419-421.

Fu Y., et al., "Uniform and Accurate Single-cell Sequencing Based on Emulsion Whole-genome Amplification", PNAS, Sep. 22, 2015, vol. 112, No. 38, pp. 11923-11928.

Hatori M.N., et al., "Particle-Templated Emulsification for Microfluidics-Free Digital Biology", Analytical Chemistry, vol. 90, No. 16, Jul. 23, 2018, pp. 9813-9820, XP093011040, the whole document, ISSN: 0003-2700, DOI: 10.1021/acs.analchem.8b01759, abstract.

"High Containment Laboratories at CDC—Fifty Years of Excellence", Centers for Disease Control and Prevention, Last Reviewed: Aug. 9, 2019, 1 Page.

International Patent Application No. PCT/US2021/013042, filed Jan. 12, 2021, International Search Report and Written Opinion, issued Mar. 29, 2021, 12 Pages.

International Patent Application No. PCT/US2021/013048, filed Jan. 12, 2021, International Search Report and Written Opinion, issued Mar. 31, 2021, 18 Pages.

International Patent Application No. PCT/US2021/013065, filed Jan. 12, 2021, International Search Report and Written Opinion issued Mar. 29, 2021, 15 pages.

International Patent Application No. PCT/US2021/013066, filed Jan. 12, 2021, International Search Report and Written Opinion, issued Mar. 29, 2021, 13 Pages.

International Patent Application No. PCT/US2021/013069, filed Jan. 12, 2021, International Search Report and Written Opinion issued Apr. 1, 2021, 13 Pages.

International Patent Application No. PCT/US2021/022503, filed Mar. 16, 2021, International Search Report and Written Opinion, issued Aug. 11, 2021, 12 Pages.

International Patent Application No. PCT/US2022/037078, filed Jul. 14, 2022, International Search Report and Written Opinion issued Oct. 12, 2022, 21 pages.

International Patent Application No. PCT/US2022/037129, filed Jul. 14, 2022, International Search Report and Written Opinion issued Oct. 11, 2022, 16 Pages.

International Search Report and Written Opinion for International Application No. PCT/US2020/47214, mailed Feb. 3, 2021, 19 Pages.

International Search Report and Written Opinion for International Application No. PCT/US2021/013045, mailed Mar. 29, 2021, 10 Pages.

International Search Report and Written Opinion for International Application No. PCT/US2021/023815, mailed Jun. 30, 2021, 19 Pages.

Jacobsen N., et al., "Direct Isolation of poly(A)+ RNA from 4 M Guanidine Thiocyanate-lysed Cell Extracts Using Locked Nucleic Acid-oligo(T) Capture", Nucleic Acids Research, vol. 32, No. 7, Apr. 19, 2004, pp. 1-10.

Karlsson K., "Counting Molecules in Cell-free DNA and Single Cells RNA", Thesis, Division of Molecular Neurobiology Department of Medical Biochemistry and Biophysics, Karolinska Institutet, 2016, 52 Pages.

(56) References Cited

OTHER PUBLICATIONS

Kim S.C., et al., "Single-Cell RT-PCR in Microfluidic Droplets with Integrated Chemical Lysis", Analytical chemistry, vol. 90, No. 2, Jan. 16, 2018, pp. 1273-1279, 13 Pages.
Klein A.M., et al., "Droplet Barcoding for Single-Cell Transcriptomics Applied to Embryonic Stem Cells", Cell, Amsterdam, NL, May 21, 2015, vol. 161, No. 5, pp. 1187-1201, 16 Pages, XP055731640.
Kukurba K.R., et al., "RNA Sequencing and Analysis", Cold Spring Harb Protoc, vol. 11, Apr. 13, 2015, pp. 951-969.
Kumaresan P., et al., "High-throughput Single Copy DNA Amplification and Cell Analysis in Engineered Nanoliter Droplets", Analytical Chemistry, May 15, 2008, vol. 80, pp. 3522-3529.
Lage J.M., et al., "Whole Genome Analysis of Genetic Alterations in Small DNA Samples Using Hyperbranched Strand Displacement Amplification and Array-CGH", Genome Research, Feb. 2003, vol. 13, No. 2, pp. 294-307.
Lyons E., et al., "Large-scale DNA Barcode Library Generation for Biomolecule Identification in High-throughput Screens", Scientific Reports, vol. 7, No. 13899, Oct. 2017, pp. 1-7.
Markus H., et al., "Analysis of Recurrently Protected Genomic Regions in cell-free DNA Found in Urine", Science Translational Medicine, vol. 13, No. 581, Feb. 17, 2021, pp. 1-31.
Mazutis L., et al., "Single-cell Analysis and Sorting Using Droplet-based Microfluidics", Nature Protocols, May 2013, vol. 8, No. 5, pp. 870-891.
Nishikawa Y., et al., "Monodisperse Picoliter Droplets for Low-bias and Contamination-free Reactions in Single-cell Whole Genome Amplification", PLOS One, vol. 10, No. 9, e0138733, Sep. 21, 2015, pp. 1-15.
Patel A.K., et al., "Design and Fabrication of Low Cost Vortex Mixer Using Additive Manufacturing", International Journal of Applied Engineering Research, vol. 14, No. 1, 2019, pp. 246-249.
Petersen L.K., et al., "Screening of DNA-encoded Small Molecule Libraries Inside a Living Cell", Journal of the American Shemical Society, vol. 143, No. 7, Feb. 24, 2021, pp. 2751-2756.
Quail M.A., et al., "A tale of Three Next Generation Sequencing Platforms: Comparison of Ion Torrent, Pacific Biosciences and Ilumina MiSeq Sequencers", BMC Genomics, vol. 13, No. 341, Jul. 24, 2012, 13 Pages.
Replogle J.M., et al., "Combinatorial single-cell CRISPR Screens by Direct Guide RNA Capture and Targeted Sequencing", Nature Biotechnology, vol. 38, No. 8, Aug. 2020, pp. 954-961.
Roche., "EmPCR Amplificaiotn Method Manual", 454 Life Sciences Corp, 2011, 12 Pages.
Sidore A.M., et al., "Enhanced Sequencing Coverage with Digital Droplet Multiple Displacement Amplification", Nucleic Acids Research, vol. 44, No. 7, e66, Apr. 20, 2016, pp. 1-9.
Stoeckius M., et al., "Simultaneous Epitope and Transcriptome Measurment in Single Cells", Nature Methods, online publication, vol. 14, No. 9, Sep. 2017, 10 pages.
Stoeckius M., et al., "Large-Scale Simultaneous Measurement of Epitopes and Transcriptomes in Single Cells", Nature Methods, Sep. 2017, vol. 14, No. 9, pp. 865-868, 17 Pages.
Suh S.K., et al., "Synthesis of Magnetic Hydrogel Microparticles for Bioassays and Tweezer Manipulation in Microwells", Microfluid ganofluid, vol. 13, 2012, pp. 655-674.
Tamminen M.V., et al., "Single Gene-based Distinction of Individual Microbial Genomes from a Mixed Population of Microbial Cells", Front Microbiology, vol. 6, No. 195, Mar. 2015, pp. 1-10.
Tokunaga T., et al., "Systematic Exploration of Lipophilic Tags That Allow Efficient Anchoring of Aptamers to Live Cell Surfaces", Chemistry Letters, vol. 42, No. 2, Feb. 2013, pp. 127-129.
Vitale S.R., et al., "An Optimized Workflow to Evaluate Estrogen Receptor Gene Mutations in Small Amounts of Cell-Free DNA", The Journal of Molecular Diagnostics, vol. 21, No. 1, Jan. 2019, pp. 123-137.
Walls A.C., et al., "Structure, Function, and Antigenicity of the SARS-CoV-2 Spike Glcoprotein", Cell, Apr. 16, 2020, vol. 180, No. 2, pp. 281-292, 20 Pages.
Zilionis R., et al., "Single-cell Barcoding and Sequencing Using Droplet Microfluidics", Nature Protocols, vol. 12, No. 1, Dec. 8, 2016, pp. 44-73, XP055532179, XP055367764, figure 1, p. 46, 47, 50, 52.
Kumari S., et al., "Quantification of Circulating Free DNA as a Diagnostic Marker in Gall Bladder Cancer", Cancer, Pathology & Oncology Research, Jan. 2017, vol. 23, No. 1, pp. 91-97.
Quail M.A., et al., "A Tale of Three Next Generation Sequencing Platforms: Comparison of Ion Torrent, Pacific Biosciences and Ilumina MiSeq Sequencers", BMC Genomics, vol. 13, No. 341, Jul. 24, 2012, pp. 1-13.

* cited by examiner

Vertical Position

Horizontal Position

Vertical Position

Horizontal Position

Vertical Position

Horizontal Position

Plan View of Loaded Microcentrifuge with Adapters

DEVICES FOR IMPROVING SAMPLE PREPARATION AND PROCESSING

CROSS-REFERENCE TO RELATED APPLICATIONS

This application claims priority to, and the benefit of, U.S. Provisional Application No. 63/275,152, filed Nov. 3, 2021, the content of which is incorporated by reference herein in its entirety.

TECHNICAL FIELD

The invention relates generally to biological sample preparation and analysis, and, more particularly, to devices for improving protocol compliance, reproducibility, and sensitivity in single-cell sequencing assays.

BACKGROUND

When performing any type of assay, it is important that the associated protocol and workflow be carried out with precision and in a timely manner. This is particularly critical when performing diagnostic assays. Rapid results with high sensitivity and specificity are key to a positive health outcome. In contrast, an inaccurate and/or late diagnosis can lead to a misdiagnosis and/or diagnosis only after late-stage disease has developed.

Transcriptional analysis of single cells by RNA sequencing is increasingly recognized as the gold standard for understanding complex cellular populations. Single-cell RNA sequencing can provide gene expression profiles of single cells and uncover heterogeneity hidden within a sample of different cellular phenotypes. As such, methods of single-cell RNA sequencing are incorporated into clinical practice to define complex pathologies, e.g., tumors, and characterize their pathogenesis for patient diagnosis and treatment.

For clinics using RNA sequencing, accurate and timely identification of differentially expressed genes is critical for informing patient health status and treatment monitoring. Although single-cell RNA sequencing has the potential to provide those services, the complexity of the workflows, high costs of specialized devices, and lack of highly skilled technicians are barriers to its widespread use outside of state-of-the-art laboratories.

The typical single-cell RNA sequencing workflow entails sample collection, preparation steps, nucleic acid extraction, cDNA library preparation, PCR amplification, sequencing, and data analysis. In particular, it is critical that certain procedures for preparing and processing a sample are executed in a precise, consistent, repeatable, and accurate manner. Without specialized devices and/or skilled workers, parts of the workflow are inefficient, overly laborious, and error prone. In particular, certain aspects of single-cell RNA sequencing require some form of manual processing, particularly with respect to sample collection and processing. However, manual sample preparation processes may increase the likelihood that a sample will become contaminated and/or improperly processed, thereby leading to an inaccurate result. Given that single-cell RNA sequencing is relatively expensive, and that the results can have a profound impact on patients' lives, extreme caution must be exercised to avoid re-runs and delays, which can be too high a price to pay when patients are waiting for tailored treatments.

SUMMARY

The present invention provides devices for improving assay protocol compliance, reproducibility, and sensitivity. In particular, devices of the present invention are tailored to certain single-cell sequencing assays, including single-cell RNA sequencing (scRNA-Seq) assays that utilize pre-templated instant partitions (PIPs). In such assays, PIPs templates are used to simultaneously segregate complex cell mixtures into partitions with barcoded template particles that can be easily processed for single cell applications, such as single-cell RNA sequencing. The devices of the present invention generally improve the manner with which a medical technologist (or other lab personnel) can carry out the various sample preparation steps involved in scRNA-Seq using PIPs template.

For example, performing a scRNA-Seq assay utilizing PIPs templates requires careful sample handling and manipulation of multiphase samples, which can be challenging for standard hand-held liquid handling pipettors. Devices of the present invention improve the reliability of liquid handling, which ultimately results in improved protocol compliance, improved assay performance, and improved assay reproducibility.

The typical workflow begins with sample preparation, in which a single cell suspension of interest is mixed with PIPs. The PIPs partition the mixture and isolate single cells inside compartments for conducting individual, parallel processes. The PIPs include template particles, which are generally hydrogel particles that function as templates, causing water-in-oil emulsion droplets to form when mixed inside a mixture of aqueous solution with oil and vortexed or sheared. The partitioning step involves vortexing, which is preferred for its ability to reliably generate partitions of a uniform size distribution. However, the PIPs templates have a tendency to settle and clump at the bottom of sample tubes. It has been found that standard vertical vortexing is inefficient and unreliable at disaggregating clumped hydrogel particles, and may ultimately result in non-uniform vortexing conditions required for reproducible PIPs partitioning.

Recognizing the limitations of vertical vortexing, the present invention provides a vortex adapter configured to mount to a standard benchtop vortex unit and to retain sample tubes in either a horizontal position or a vertical position, thereby allowing for horizontal or vertical vortexing as desired. In particular, the vortex adapter comprises a base including a proximal end releasably couplable to a hub of a standard vortex unit and a distal end to which a tube holder is mounted. The tube holder includes apertures or slots into which individual tubes are placed and retained via a friction fit, for example. The tube holder may generally be releasably mounted to the distal end of the base in either a vertical position (i.e., the cap of each tube is facing upwards and away from the vortex unit) or a horizontal position (i.e., the tubes are positioned on their sides relative to the vortex unit). By providing a vortex adapter that allows for a selectable position (i.e., vertical or horizontal position), a technician can perform both horizontal and vertical vortexing as needed and realize the benefits of each. In particular, horizontal vortexing generates more chaotic mixing and is effective at disaggregating settled PIPs templates while the improved vertical vortexing resulting from the invention is useful for providing uniform particle templated emulsification.

In some assays, magnetic nanoparticles may be used in partitioning and isolating target cells (via an associated binding element). Accordingly, when exposed to a sample, the binding elements bind with their partners (i.e., target analyte) and the emulsion forms partitions (e.g., droplets) that sequester the analyte. The partitions may then be manipulated using a magnetic field applied to the vessel containing the emulsion. However, magnetic particle-loaded PIPs templates are weakly magnetic, and, as a result, are unable to be efficiently collected via standard magnetic separators. Accordingly, the present invention provides a magnetic collector device that enables at least a two-stage magnetic separation by providing at least two orientations of a magnetic field relative to sample tubes. In particular, the magnetic collector device comprises a platform including multiple slots or apertures for holding sample tubes within and arranged in a row. The device further includes a magnet assembly comprising a set of magnets provided on a moveable guide and arranged in a row and aligned with respective apertures of the platform. The moveable guide is configured to transition between a bottom-most position and a top-most position relative to the aperture on the platform. When in the bottom-most position, each magnet is positioned adjacent to a bottom portion of a respective tube held within a respective slot. When in the top-most position, each magnet is positioned adjacent to a side portion of a respective tube held within a respective slot. In the bottom-most position, magnetic particles are attracted to the bottom of the sample tube, while in the top-most position, magnetic particles are attracted to a side of the sample tube. By providing at least two different orientations of a magnetic field, the magnetic collector device improves the ability with which magnetic particles can be collected from the sample tubes.

After agitation of the sample with the PIPs templates (e.g., vortexing), a plurality (e.g., thousands, tens of thousands, hundreds of thousands, one million, two million, ten million, or more) of aqueous partitions is formed simultaneously inside the tube. Vortexing causes the fluids to partition into a plurality of monodisperse droplets. A substantial portion of droplets will contain a single template particle and a single cell. Droplets containing more than one or none of a template particle or target cell can be removed, destroyed, or otherwise ignored.

The next steps in the workflow involves lysing the single cells and capturing released mRNA inside the partitions. First-strand cDNA is then generated via reverse transcription (RT) and amplified to create a cDNA library for each individual cell. These are then processed into sequencing libraries using standard library preparation methods and subsequently sequenced and analyzed. Such processes generally involve, and require, careful sample handling and manipulation of the multiphase samples, including washing and fluid handling. Recognizing the difficulties technicians face with standard hand-held liquid handling pipettors, the present invention provides a sample tube holder, generally in the form of a guide rack, that incorporates certain visual aids to enable precise removal of excess volume in washing and fluid handling steps. In particular, the guide rack includes a plurality of slots or apertures configured to receive and releasably retain sample tubes therein, and further includes a visual guide rod positioned relative to each slot or aperture. The visual guide rod may be at a fixed position that corresponds to a particular volume at which excess fluid can be removed from a given tube. Accordingly, the guide rack improves the ease with which a technician can work with the sample tubes, particularly during washing and fluid handling steps.

It is noted that certain steps (including washing steps) may further require the use of a centrifuge. For example, centrifuging a sample tube prior to performing PCR ensures that all reactants are in the bottom of the tube for proper concentrations and improved yields. A common issue encountered with a standard benchtop centrifuge is that sample tubes sit at a fixed and angled position, which results in formation of a slanted pellet within the tube, which is not optimal. Some centrifuges have been developed that are configured to receive microwell plates (i.e., typically 96-, 384-, or 1536-well plates) and swing the plates into a vertical position (whereas, the wells comprising the plates are oriented horizontally) during operation, thereby resulting in concentrating the resulting pellet into the well bottoms. However, such centrifuges (also referred to as microplate microcentrifuges) are limited to receiving microwell plates and are unable to accept individual sample tubes.

The present invention provides a centrifuge adapter allowing for standard benchtop microwell plate centrifuges to accommodate individual sample tubes and/or strip tube configurations. The adapter comprises a base portion shaped and/or sized to fit within a microwell plate holder of a microcentrifuge. The base portion is configured to receive and releasably retain sample tube holders thereto. In particular, the base portion includes multiple recesses shaped and/or sized to receive and retain portions of sample tube holders thereto. For example, in one embodiment, the base portion may include a recess defined on each end thereof in which portions of respective sample tube holders may be received and retained. A given sample tube holder includes a frame including apertures for receiving sample tubes within (i.e., 0.5 mL, 1.5 mL, 2.0 mL Eppendorf tubes). The frame may further include one or more gradation lines or other visual indicia adjacent the apertures for providing a technician with a visual indication of certain tube fill volumes (when a sample tube is placed within). In some embodiments, each sample tube holder may be configured to releasably attach to another sample tube holder via magnets or other connecting means that are integrated into sides of the sample tube holder, to thereby arrange the sample tubes in a row. Once loaded into a microwell plate holder, the base of the centrifuge adapter retains sample tube holders in a horizontal position such that individual tubes are also positioned in a horizontal orientation, in which the bottom of the tubes are facing an outward direction and the tops are facing an inward direction. Accordingly, operation of the centrifuge will result in a substantially level, and more concentrated, pellet to form in the bottom of the tubes. Accordingly, the centrifuge adapter is able to adapt various sample tube formats to a common microplate microcentrifuge, which was previously limited to only accepting microwell plates.

Accordingly, devices of the present invention improve upon protocol compliance, reproducibility, and sensitivity, particularly in single-cell sequencing assays. Such devices are tailored to single-cell RNA sequencing assays that utilize PIPs and will ultimately improve the manner with which a medical technologist (or other lab personnel) carry out the various sample preparation steps involved in single-cell RNA sequencing using PIPs templates, thereby reducing overall time required in performing a given assay and further reducing the risk of inaccurate diagnoses.

One aspect of the present invention includes a vortex adapter configured for use with a vortex mixer. The vortex adapter includes: a base comprising a proximal portion releasably couplable to a hub of a vortex mixer; and a tube holder releasably mounted to a distal portion of the base and comprising a plurality of apertures for receiving a plurality of tubes, respectively, wherein said tube holder is movable between a first position in which each of said apertures is oriented in a vertical direction relative to the base and a second position in which each of said apertures is oriented in a horizontal direction relative to the base.

Each of the plurality of apertures is shaped and/or sized to retain a respective tube therein and configured to subject any tubes within to vortex forces from a vortex mixer. The apertures may be shaped and/or sized to receive and retain a tube comprising of volume of between 0.1 mL and 5 mL. When the tube holder is in the first position, each of the apertures retains respective tubes received therein in a vertical direction. In such a configuration, a longitudinal axis of each tube is orthogonal relative to a surface upon which a vortex mixer is placed. For example, in such a position, tubes received and retained within respective apertures may be subjected to vertical vortexing upon receipt of vortex forces from the vortex mixer. When the tube holder is in the second position, each of the apertures retains respective tubes received therein in a horizontal direction. In such a configuration, a longitudinal axis of each tube is parallel relative to a surface upon which a vortex mixer is placed. For example, in such a position, tubes received and retained within respective apertures are subjected to horizontal vortexing upon receipt of vortex forces from the vortex mixer.

In some embodiments, the tube holder comprises at least a first set of apertures arranged in a row. For example, the tube holder may include a single set of apertures arranged in a row and provided on one side of the tube holder. In some embodiments, the tube holder comprises two sets of apertures, each set arranged in a separate room and provided on opposing side of the tube holder.

The tube holder may further include one or more counterweights provided on an opposing side of the tube holder for balancing inertial forces upon receipt of vortex forces from the vortex mixer.

The vortex adapter may further include a connection member provided at the distal portion of the base and selectively moveable between an engaged position and a disengaged position. When in an engaged position, the connection member maintains the tube holder in one of the first and second positions and, when in a disengaged position, the tube holder is moveable between the first and second positions. The distal portion of the base may include a channel defined between two knuckle members. The connection member may include an adjustable bolt assembly extending between the knuckle members and configured to draw the knuckle members together upon movement of the bolt assembly to an engaged position. The tube holder may include a body portion sized to fit within the channel in either of the first and second positions such that, when in an engaged position, the connection member causes the knuckle members to apply a retention force upon the body portion of the tube holder and prevent movement thereof within the channel.

Another aspect of the present invention includes a magnetic separator device. The magnetic separator device includes: a platform comprising a plurality of apertures for receiving and retaining a plurality of tubes therein; and a magnetic assembly comprising a guide member and a plurality of magnets provided on a surface thereof, wherein the magnetic assembly provided beneath the plurality of apertures and is moveable in both vertical and horizontal directions relative to the apertures.

The magnetic assembly is movable between an upper-most position, in which the surface of the guide member is substantially parallel with a longitudinal axis of each aperture and the magnets are a closer distance to the plurality of apertures, and a lower-most position, in which the surface of the guide member is orthogonal relative to the longitudinal axis of each aperture and the magnets a farther distance to the plurality of apertures.

The plurality of apertures may generally be arranged in a row on the platform and the plurality of magnets are arranged in a corresponding row on the guide member. For example, each of the plurality of magnets may correspond to a separate one of the plurality of apertures, such that each of the plurality of magnets is substantially aligned with the corresponding aperture. Accordingly, when a tube is received and retained within an aperture, a corresponding magnet is positioned adjacent to a bottom of the tube when the magnetic assembly is in the lower-most position and positioned adjacent to a side portion of the tube when the magnetic assembly is in the upper-most position. Each of the apertures is shaped and/or sized to receive and retain a tube comprising of volume of between about 0.1 mL and about 50 mL. As such, each of the apertures is configured to retain a corresponding tube in a vertical direction.

When the magnetic assembly is in the upper-most position, magnetic particles within a tube are attracted to a sidewall of the tube due to magnetic attractive forces and when the magnetic assembly is in the lower-most position, magnetic particles within a tube are attracted to a bottom of the tube due to magnetic attractive forces. As such, when the magnetic assembly transitions from the upper-most position to the lower-most position, magnetic particles within a tube correspondingly move from a sidewall of the tube toward a bottom of the tube due to magnetic attractive forces.

The platform of the magnetic separator device may include opposing sidewalls, wherein each sidewall comprising a corresponding slot for guiding the magnetic assembly between the upper-most and lower-most positions. For example, the guide member may generally be positioned between the opposing sidewalls and comprises support members extending through the corresponding slots on the opposing sidewalls. The slots may be L-shaped.

The platform of the magnetic separator device may include a wall member that comprises one or more magnets provided thereon. The magnetic assembly may be releasably maintained in the upper-most position due to magnetic attractive forces between the one or more magnets of the wall member in the platform and one or more magnets of the magnetic assembly.

The magnets used in the magnetic separator device may be permanent magnets, such as rare earth magnets. In some embodiments, the magnets used in the magnetic separator device may be electromagnets. The electromagnets may be operably coupled to one or more timers such that one or more magnetic fields are produced in an automated fashion based, at least in part, on said one or more timers.

Another aspect of the present invention includes a centrifuge adapter for use with a microcentrifuge. The centrifuge adapter is generally shaped and/or sized to fit within a microwell plate holder of a microcentrifuge and support individual tubes. The adapter generally comprises a base portion including one or more recesses shaped and/or sized to receive and retain portions of tube holders thereto. For example, the base portion may include at least a first recess defined on a first end and a second recess defined on a second, opposing end. The centrifuge adapter further includes a first tube holder and a second tube holder configured to be releasably coupled to the base portion via engagement between respective portions of the first and second tube holders and corresponding first and second recesses. Each tube holder may include a frame including a plurality of apertures for receiving individual tubes within (e.g., tubes comprising a volume of between 0.1 mL to 5.0 mL).

A portion of the frame of each tube holder may generally be shaped and/or sized to be received within at least one of the first and second recesses. Furthermore, the frame of each tube holder may further include one or more gradation lines or other visual indicia adjacent to the apertures for providing a technician with a visual indication of fill volumes.

When assembled, the base portion of the adapter comprises the first and second tube holders releasably coupled thereto and the apertures on the frame are oriented in a substantially horizontal direction. Accordingly, tubes received within the respective apertures may be positioned in a substantially horizontal direction once the base portion is loaded into a microwell plate holder of a microcentrifuge, wherein the bottom of a tube is facing in an outward direction and the top of a tube is facing an inward direction.

In some embodiments, each tube holder may be releasably attachable to each other via a corresponding connection assembly. For example, the frame of each tube holder may include one or more magnets provided on both sides of the frame. As such, two tube holders may be releasably attachable to each other via attraction forces between magnets on respective sides of the tube holders.

BRIEF DESCRIPTION OF THE DRAWINGS

FIGS. 11A, 111B, and 11C show a slidable magnetic assembly transitioning from an upper-most position to a lower-most position relative to the sample tubes, thereby resulting in collection of magnetic particle-loaded PIPs templates within each sample tube at a bottom of the tube.

DETAIL DESCRIPTION

Figure 1:
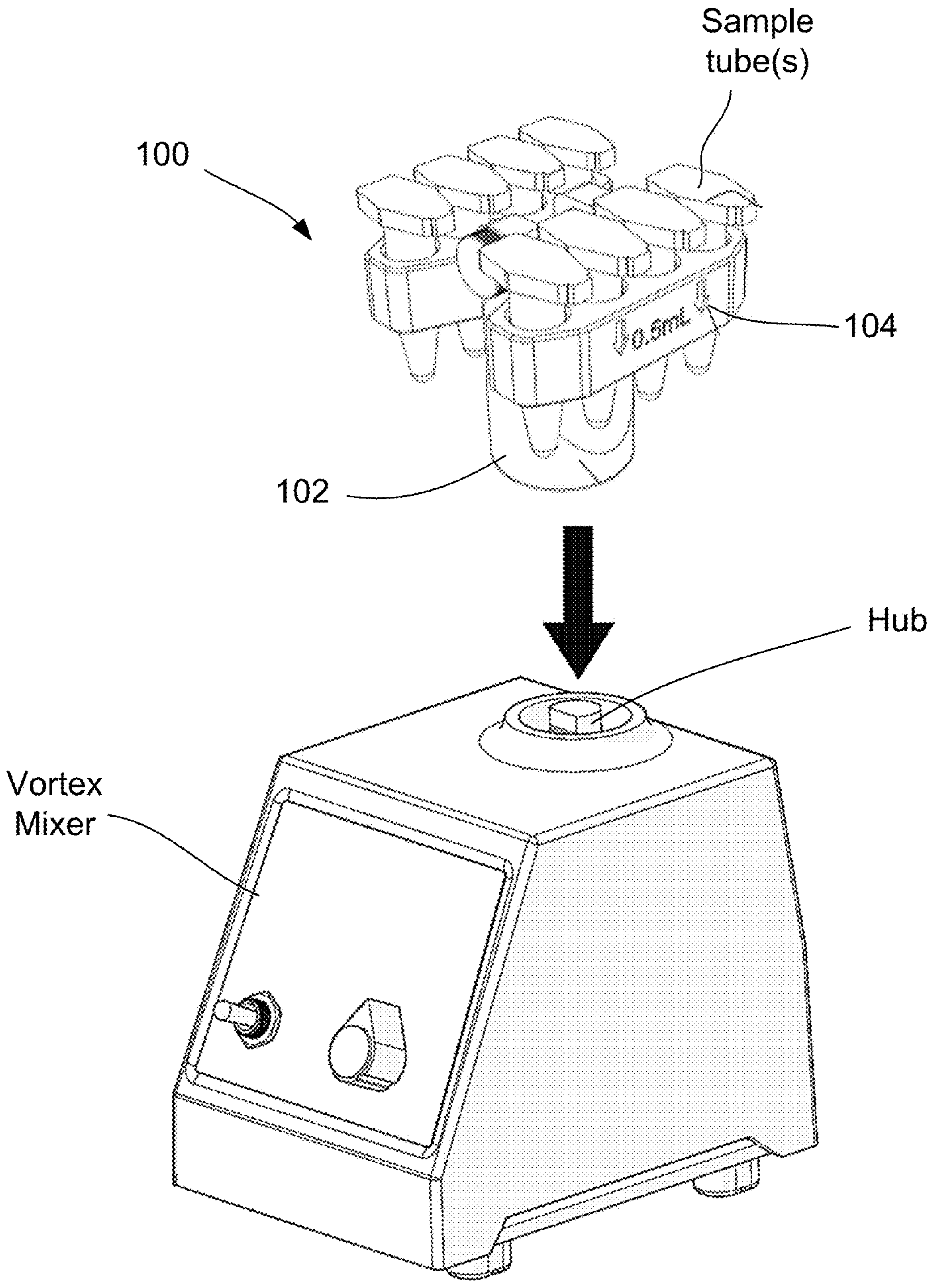
FIG. 1 shows an exemplary embodiment of a vortex adapter for use with a vortex mixer.

By way of overview, the present invention provides devices for improving assay protocol compliance, reproducibility, sensitivity, and specificity. As described in detail herein, devices of the present invention are particularly useful when performing certain single-cell sequencing assays, including single-cell RNA sequencing assays that utilize pre-templated instant partitions (PIPs). However, it is noted that devices according to the invention are useful when performing most assays, particularly when preparing biological samples for processing (including isolation of specific target cells of interest from a biological sample), and during most fluid handling and sample washing steps.

For example, performing a single-cell RNA sequencing (ScRNA-Seq) assay utilizing PIPs templates requires careful sample handling and manipulation of multiphase samples, which can be challenging for standard hand-held liquid handling pipettors. In such sequencing assays, PIPs templates are used to simultaneously segregate complex cell mixtures into partitions with barcoded template particles that can be easily processed for single cell applications, such as ScRNA-Seq.

Devices of the present invention generally improve the manner with which a medical technologist (or other lab personnel) carries out the various sample preparation steps involved in ScRNA-Seq using PIPs templates. In particular, devices of the present invention improve the reliability of liquid handling, which ultimately results in improved protocol compliance, improved assay performance, and improved assay reproducibility.

ScRNA-Seq assays utilize PIPs templates to form monodisperse droplets for segregating single cells and preparing a library preparation thereof to profile expression of the single cells. The PIPs template particles are used to template the formation of monodisperse droplets to generally capture a single target cell in an encapsulation, derive a plurality of distinct RNA from the single target cell, and prepare a library of nucleic acids that can be traced to the cell from which they were derived, and quantify distinct RNA to generate an expression profile of the single target cell. Such assays can be used to prepare libraries for single cell analysis of, for example, at least 100 cells, at least 1000 cells, at least 1,000,000 cells, at least 2,000,000 cells, or more, from a single reaction tube.

The typical workflow begins with sample preparation, in which a single cell suspension of interest is mixed with PIPs. The PIPs partition the mixture and isolate single cells inside compartments for conducting individual, parallel processes. The PIPs include template particles, which are generally hydrogel particles that function as templates, causing water-in-oil emulsion droplets to form when mixed inside a mixture of aqueous solution with oil and vortexed or sheared. The template particles may be provided in the aqueous solution (e.g., saline, nutrient broth, water) inside a tube or dried to be rehydrated at time of use. A sample comprising cells may be added into a tube (e.g., directly upon sample collection from a cell culture dish, or after some minimal sample prep step such as centrifuging the cells and re-suspending the cells in a buffered saline solution). Preferably an oil is added to the tube (which will typically initially overlay the aqueous mixture).

For example, an aqueous mixture can be prepared in a reaction tube that includes template particles and cells in aqueous media (e.g., water, saline, buffer, nutrient broth, etc.). The cells can be any cell type that contains RNA. The cells can be obtained from cellular tissue taken from a subject. For example, the cells may be cells taken from a subject by a blood draw. The subject may be suspected of carrying a contagious pathogen. Alternatively, the cells may be tissue culture cells. The cells can be nonadherent or adherent cells, e.g., HeLa cells. The cells can be primary cells, stem cells, epithelial cells, endothelial cells, fibroblast cells, or neurons.

After combining the cells with template particles inside a tube, an oil is added to the tube, and the tube is agitated (e.g., on a vortexer, also referred to as a vortex mixer). The particles act as templates in the formation of monodisperse droplets that each contain one particle in an aqueous droplet, surrounded by the oil. The pre-templated instant partitions are useful to segregate large numbers of cells into single cell compartments quickly, and without any expensive instrumentation (e.g., microfluidic devices). As such, samples for single cell RNA sequencing can be initially prepared at almost any location, such as in the field or at a remote laboratory. The partitions are formed around hydrogels and provide stable reaction chambers that can be transported by courier and/or where RNA is prepared for sequencing.

As noted, the partitioning step involves vortexing, which is preferred for its ability to reliably generate partitions of a uniform size distribution. However, the PIPs templates have a tendency to settle and clump at the bottom of sample tubes. It has been found that standard vertical vortexing is inefficient and unreliable at disaggregating clumped hydrogel particles, and may ultimately result in non-uniform vortexing conditions required for reproducible PIPs partitioning.

Recognizing the limitations of vertical vortexing, the present invention provides a vortex adapter configured to mount to a standard benchtop vortex unit and retain sample tubes in either a horizontal position or a vertical position, thereby allowing for horizontal or vertical vortexing as desired.

FIG. 1 shows an exemplary embodiment of a vortex adapter 100 for use with a vortex mixer. As shown, the vortex adapter 100 includes a base 102 including a proximal end releasably couplable to a hub of a standard vortex mixer and a distal end to which a tube holder 104 is mounted. The tube holder includes apertures or slots into which individual tubes may be placed and retained via a friction fit, for example. It should be noted that, depending on the size of the tubes to be used, different tube holders may be provided and are interchangeable with the base 102. In other words, a single base 102 is needed, as different configured tube holders 104 may be releasably mounted to the same base 102 and are interchangeable with one another.

Figure 2:
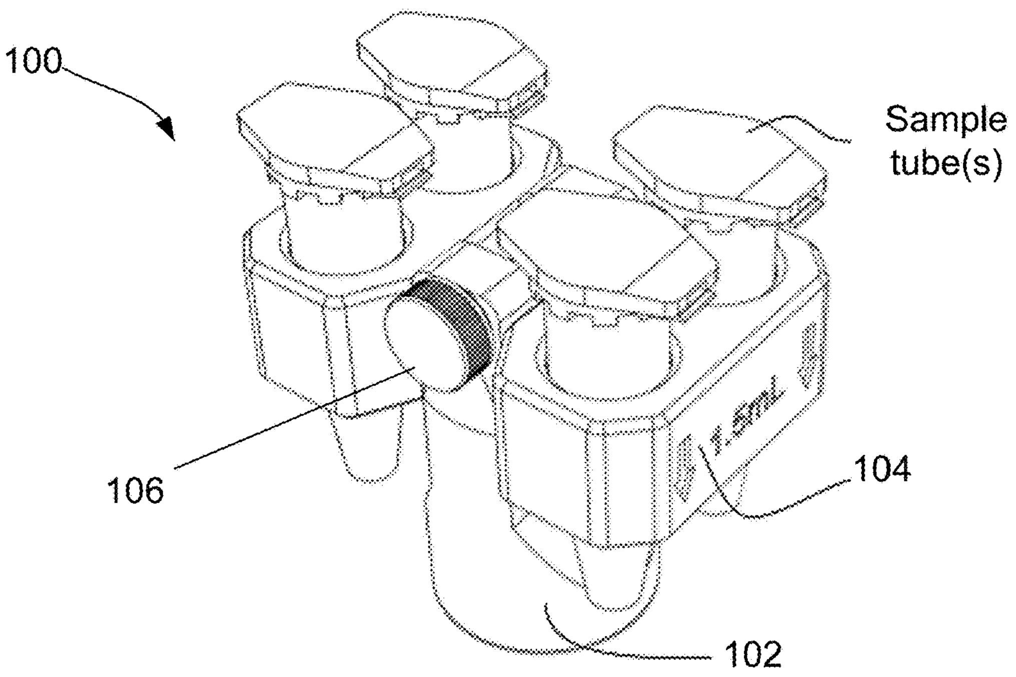
FIGS. 2 and 3 are enlarged views of a vortex adapter, configured to retain 1.5 mL sample tubes, in a vertical position and a horizontal position, respectively.
Figure 3:
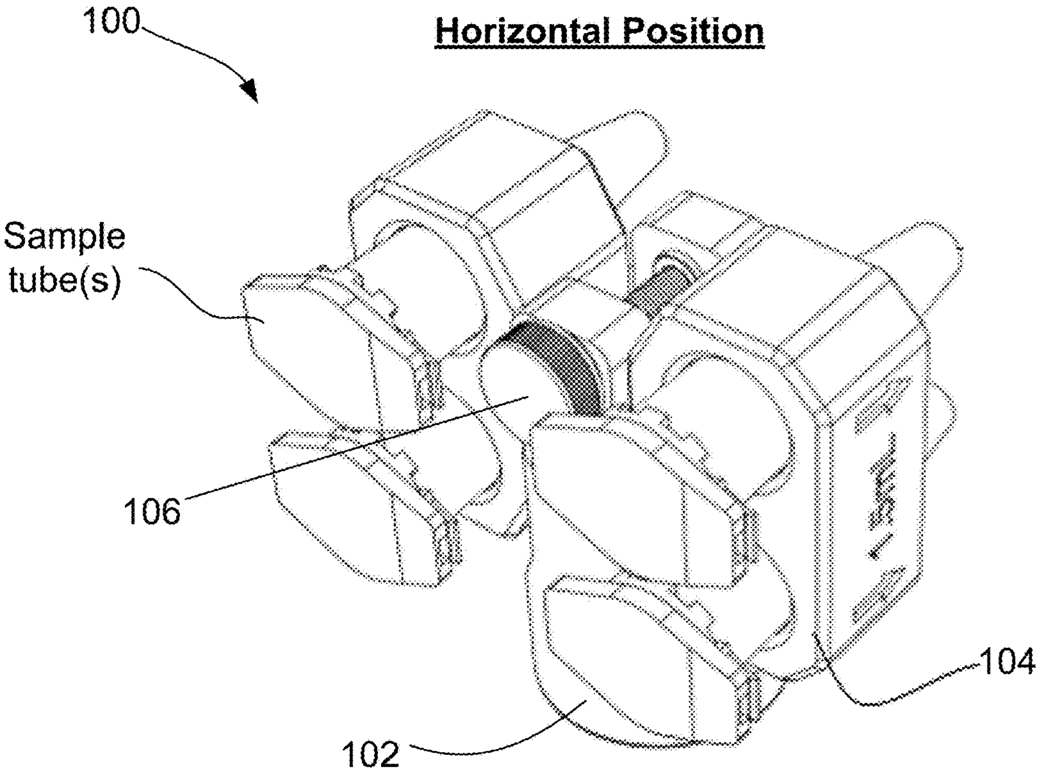
Figure 4:
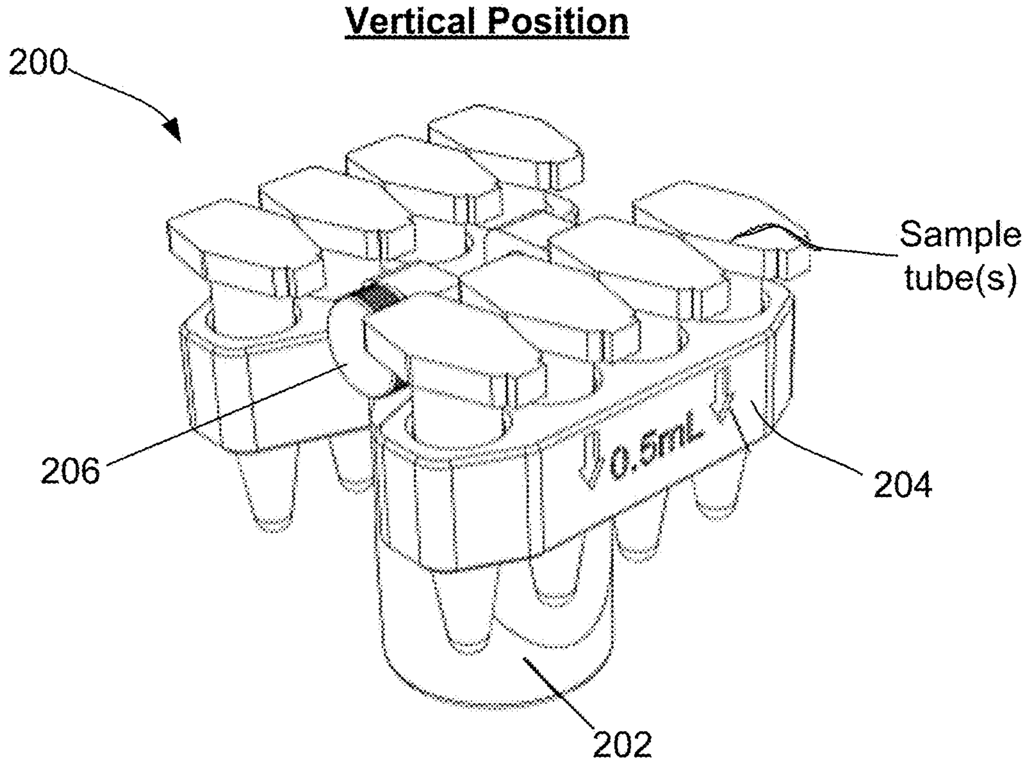
FIGS. 4 and 5 are enlarged views of a vortex adapter, configured to retain 0.5 mL sample tubes, in a vertical position and a horizontal position, respectively.
Figure 5:
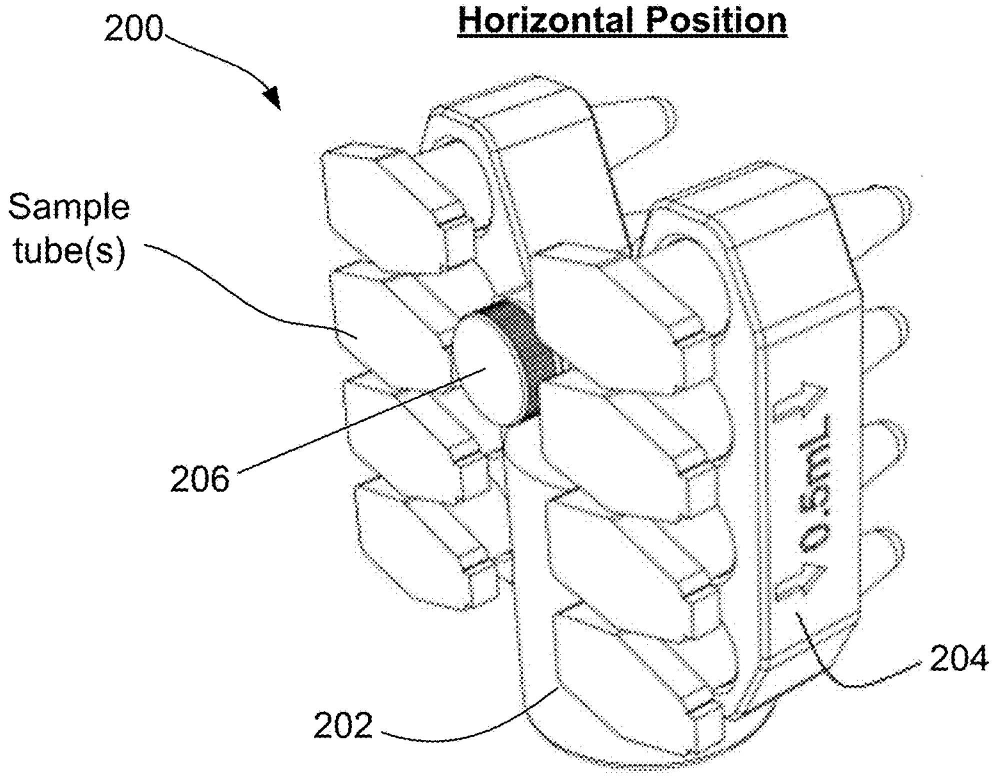
Figure 6:
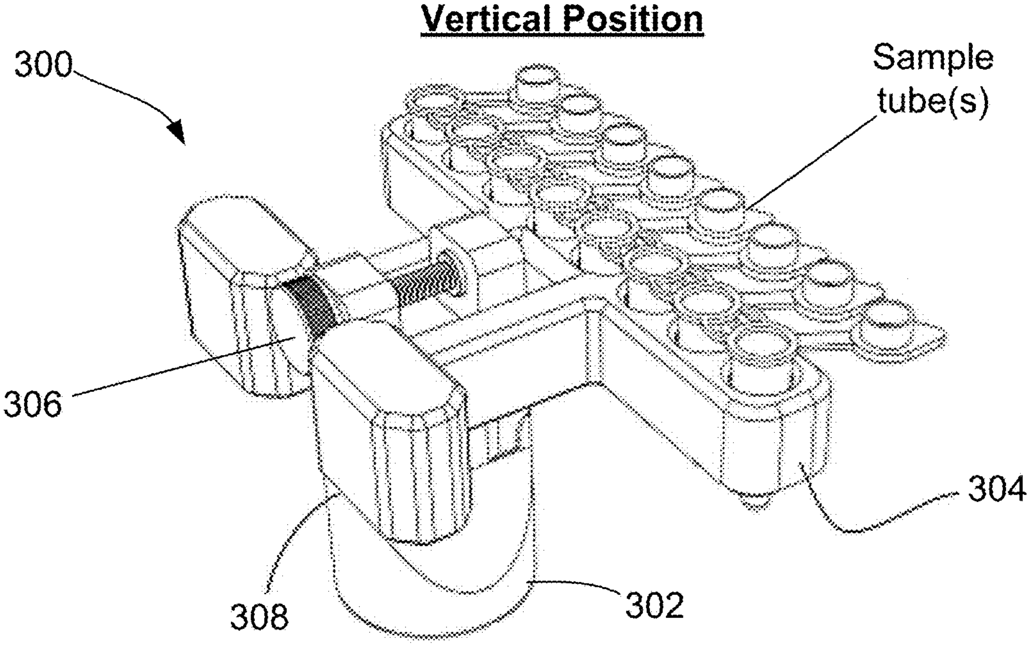
FIGS. 6 and 7 are enlarged views of a vortex adapter, configured to retain a strip of 200 uL sample tubes, in a vertical position and a horizontal position, respectively.
Figure 7:
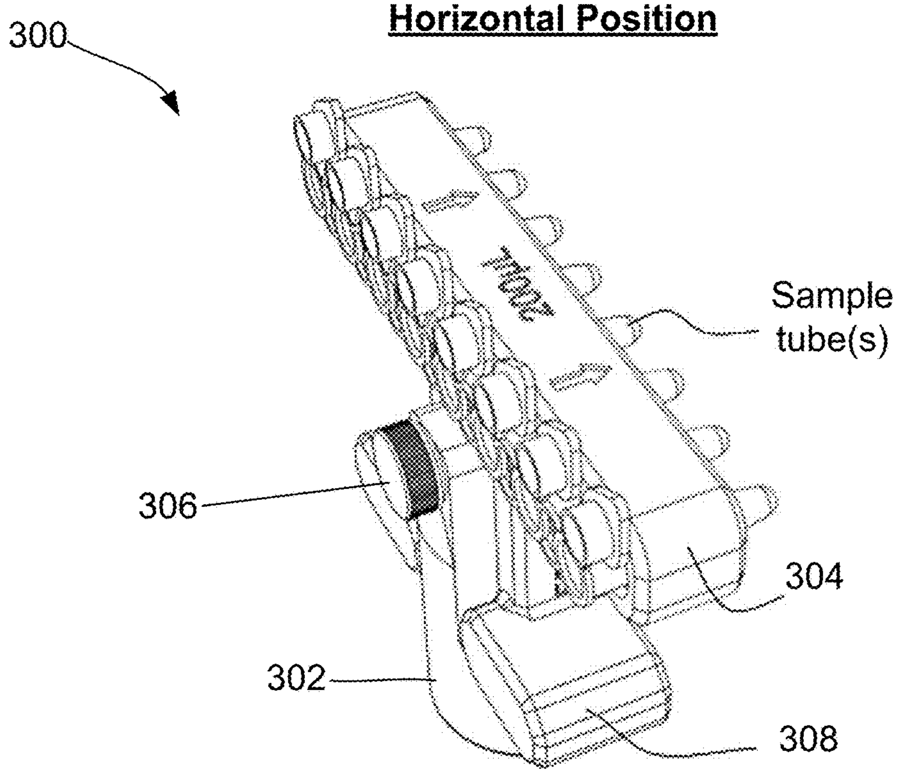

For example, FIGS. 2 and 3 are enlarged views of the vortex adapter 100 in which the tube holder 104 is configured to retain 1.5 mL sample tubes, while FIGS. 4 and 5 are enlarged views of a vortex adapter 200 in which the tube holder 204 is configured to retain 0.5 mL sample tubes. Yet still, FIGS. 6 and 7 are enlarged views of a vortex adapter 300 in which the tube holder 304 is specifically designed to retain a strip of 0.2 mL sample tubes.

As shown, the tube holder 104 is releasably mounted to a distal portion of the base 102, wherein said tube holder 104 is movable between a first position in which each of said apertures is oriented in a vertical direction relative to the base 102 and a second position in which each of said apertures is oriented in a horizontal direction relative to the base 102. For example, the tube holder may be mounted to the distal end of the base in a vertical position (i.e., the cap of each tube is facing upwards and away from the vortex mixer), as shown in FIGS. 2, 4, and 6, or mounted in a horizontal position (i.e., the tubes are positioned on their sides relative to the vortex mixer), as shown in FIGS. 3, 5, and 7.

By providing a vortex adapter that allows for a selectable position (i.e., vertical or horizontal position), a technician can perform both horizontal and vertical vortexing as needed and realize the benefits of each. In particular, horizontal vortexing generates more chaotic mixing and is effective at disaggregating settled PIPs templates while vertical vortexing is useful for providing uniform particle templated emulsification.

As illustrated in at least FIGS. 2-5, the tube holder 104, 204 may include at least two sets of apertures arranged in a separate row and provided on opposing sides of the tube holder 104, 204. However, in some embodiments, such as the tube holder 304 shown in FIGS. 6 and 7, only a single set of apertures arranged in a row may be provided on one side of the tube holder 304. In such an embodiment, the tube holder 304 may further include one or more counterweights 308 provided on an opposing side of the tube holder for balancing inertial forces upon receipt of vortex forces from the vortex mixer.

The vortex adapter further includes a connection member 106 provided at the distal portion of the base and is selectively moveable between an engaged position and a disengaged position. When in an engaged position, the connection member 106 maintains the tube holder 104, 204 in one of the first and second positions. When in a disengaged position, the tube holder 104, 204 is moveable between the first and second positions.

For example, as illustrated, the distal portion of the base may include a channel defined between two knuckle members. The connection member 106 may include an adjustable bolt assembly extending between the knuckle members and configured to draw the knuckle members together upon movement of the bolt assembly to an engaged position.

The tube holder 104, 204 may generally comprise a body portion that is sized to fit within the channel in either of the first and second positions. Accordingly, when in an engaged position, the connection member 106 causes the knuckle members to apply a retention force upon the body portion of the tube holder 104, 204 and prevent movement thereof within the channel. In order to transition between vertical and horizontal positions, a technician need only disengage the tension (i.e., unscrew the bolt), adjust the body portion of the tube holder (i.e., rotate the tube holder to either a vertical or horizontal position) and then engage the connection assembly (i.e., screw the bolt to apply tension).

Figure 8:
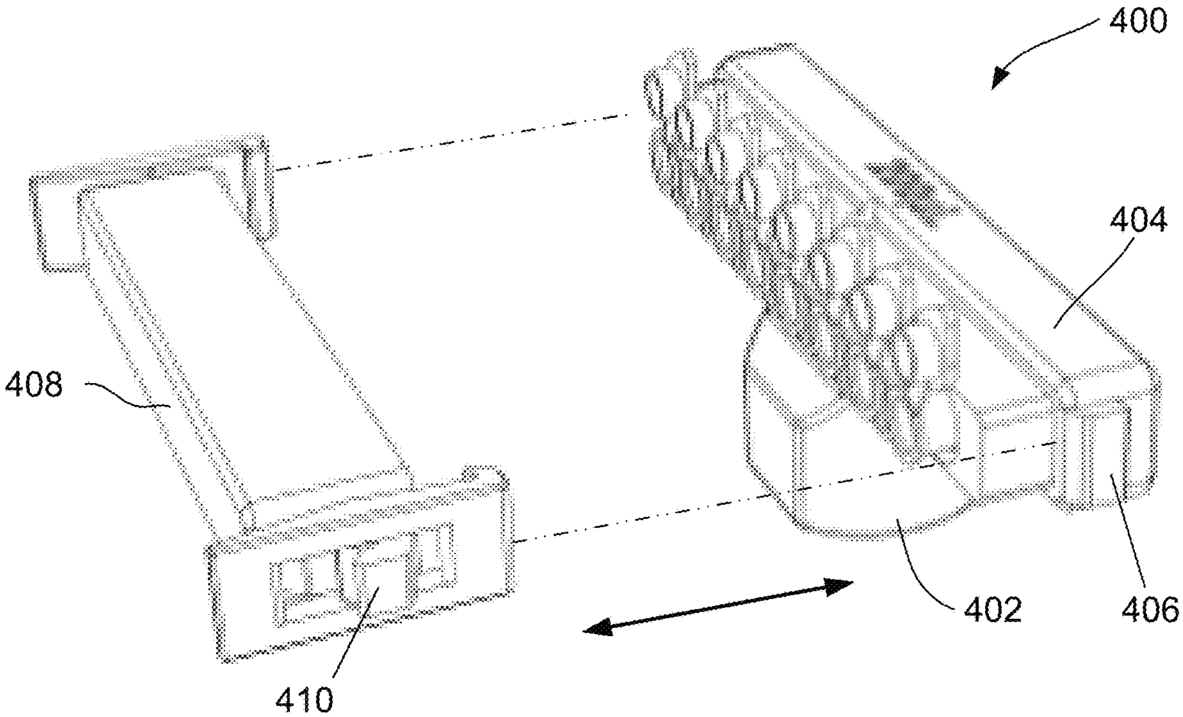
FIG. 8 is a perspective view of another embodiment of a vortex adapter which remains in a fixed horizontal position and configured to accommodate an 8 sample strip.
Figure 9:
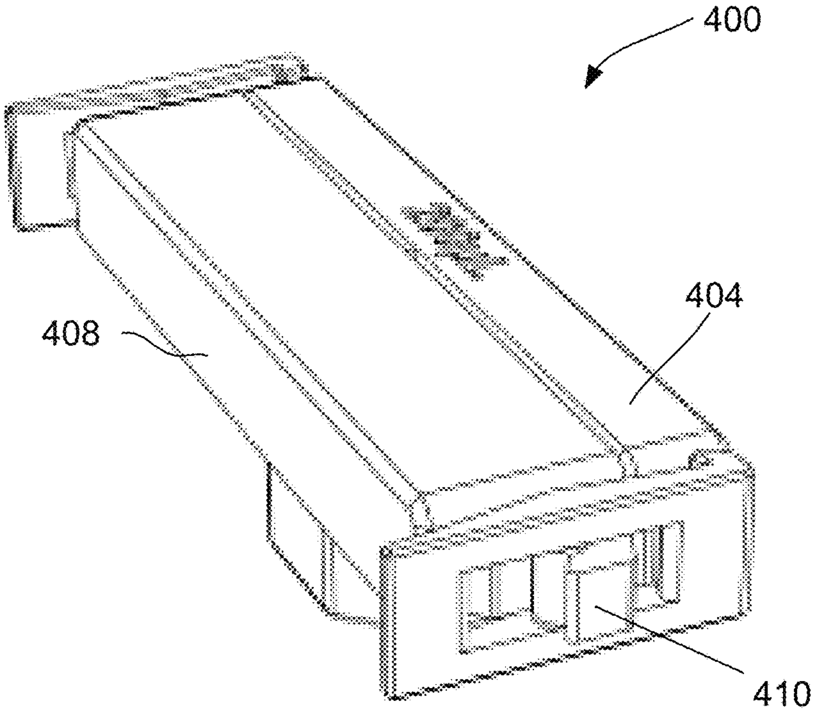
FIG. 9 shows the vortex adapter in a fully assembled state, in which a removable clamping lid is fully attached to the tube holder.

FIG. 8 is a perspective view of another embodiment of a vortex adapter 400 which remains in a fixed horizontal position and is configured to accommodate an 8 sample strip. As shown, the adapter 400 includes a base 402 including a proximal end releasably couplable to a hub of a standard vortex mixer. The adapter 400 includes a tube holder 404 comprising a plurality of apertures shaped and/or sized to receive an 8-sample tube strip. The tube holder 404 is fixed in a horizontal orientation, as opposed to being movable between horizontal and vertical positions. Such a configuration in this instance enables a more efficient agitation of beads within a given sample tube and can therefore more thoroughly disperse gravity packed beads. The adapter 400 further includes a separate clamping lid 408 that is configured to fasten to the tube holder 404 by way of a connection assembly (i.e., a snap fit means in which the tube holder 404 includes a protrusions or ridges 406 on sides thereof and the lid 408 includes corresponding moveable clips 410 on opposing sides thereof that correspondingly engage with the ridges 406 of the tube holder 404). The clamping lid can simply snap in place so as to secure the tube strip within the respective apertures of the tube holder 404 and maintain pressure on the tube lids to eliminate unintentional tube opening. FIG. 9 shows the vortex adapter 400 in a fully assembled state, in which a removable clamping lid 408 is fully attached to the tube holder 404.

In some assays, magnetic nanoparticles may be used in partitioning and isolating target cells (via an associated binding element). Accordingly, when exposed to a sample, the binding elements bind with their partners (i.e., target analyte) and the emulsion forms partitions (e.g., droplets) that sequester the analyte. The partitions may then be manipulated using a magnetic field applied to the vessel containing the emulsion. However, magnetic particle-loaded PIPs templates are weakly magnetic, and, as a result, are unable to be efficiently collected via standard magnetic separators.

Figure 10:
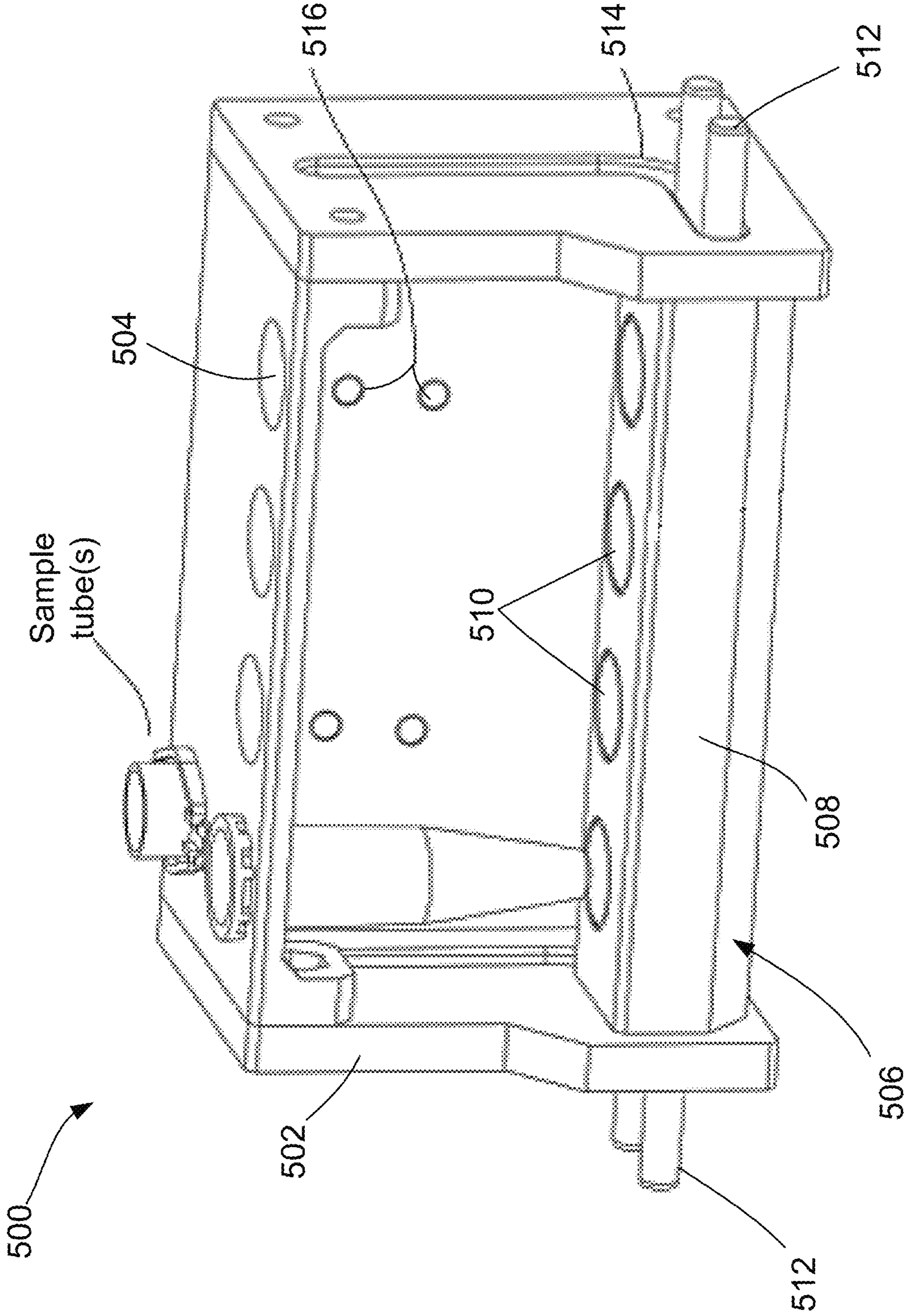
FIG. 10 is a perspective view of a device enabling two-stage magnetic separation (separation of magnetic nanoparticles used in partitioning and isolating target cells) by providing at least two orientations of a magnetic field relative to sample tubes.

Accordingly, the present invention provides a magnetic separator device that enables at least a two-stage magnetic separation by providing at least two orientations of a magnetic field relative to sample tubes. FIG. 10 is a perspective view of a magnetic separator device 500 consistent with the present disclosure. The device 500 includes a platform 502 comprising a plurality of apertures 504 for receiving and retaining a plurality of tubes therein. The device 500 further includes a magnetic assembly 506 comprising a guide member 508 and a plurality of magnets 510 provided on a surface thereof. The magnetic assembly 506 is generally provided beneath the plurality of apertures 504 and is moveable in both vertical and horizontal directions relative to the apertures 504. In particular, the magnetic assembly 506 is movable between an upper-most position and a lower-most position, and a plurality of positions therebetween.

Figure 11A:
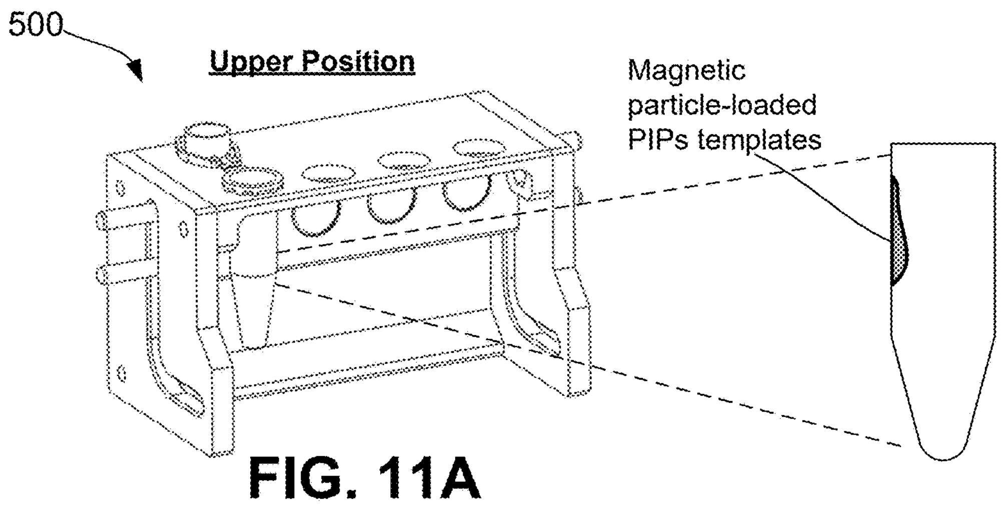
Figure 11B:
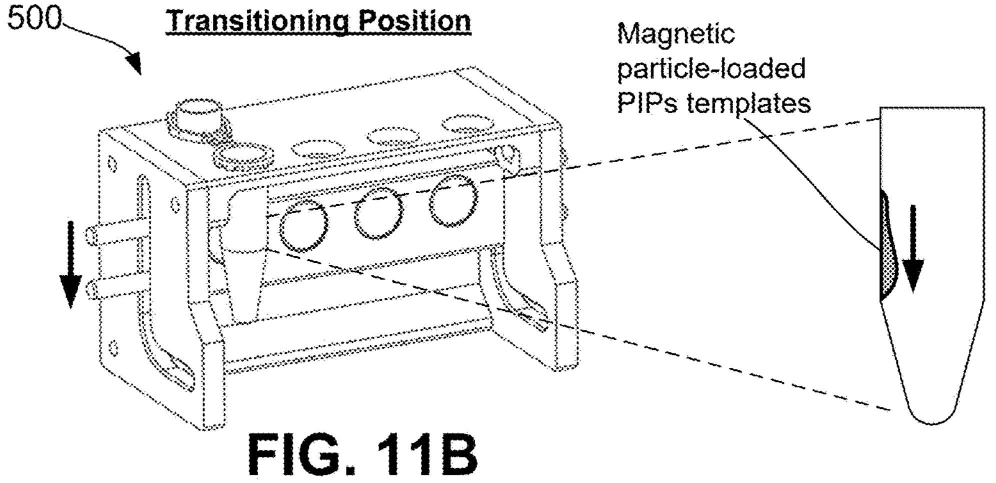
Figure 11C:
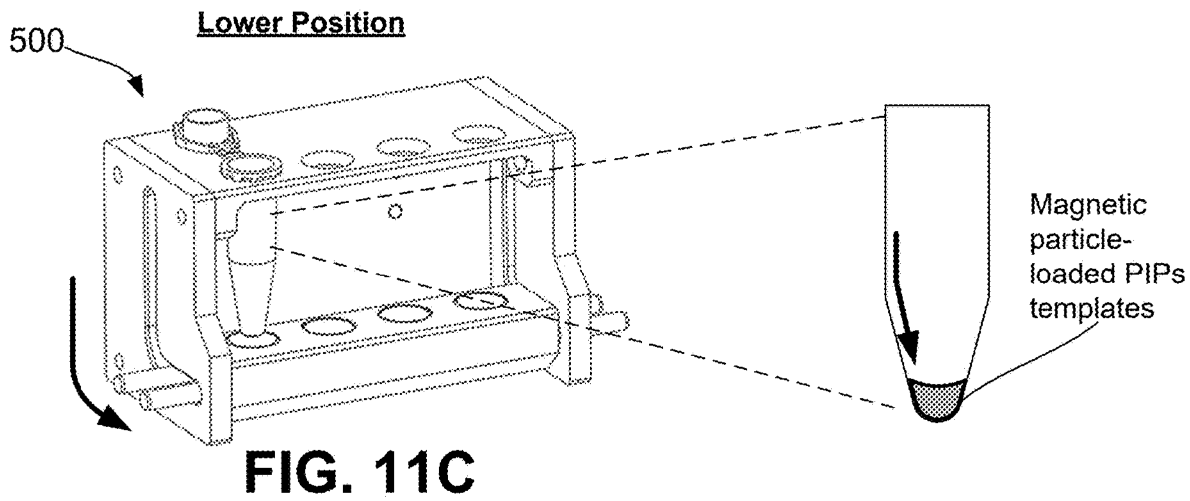

For example, FIGS. 11A, 111B, and 11C show the slidable magnetic assembly 506 transitioning from an upper-most position (FIG. 11A) to a lower-most position (FIG. 11C) relative to the sample tubes, thereby resulting in collection of magnetic particle-loaded PIPs templates within each sample tube at a bottom of the tube. In particular, the surface of the guide member 508 is substantially parallel with a longitudinal axis of each aperture and the magnets are a closer distance to the plurality of apertures when the magnetic assembly 506 is at the upper-most position. As the magnetic assembly 506 transitions from the upper-most position toward the lower-most position (FIG. 11B), the assembly 506 continues to be down and away from the apertures, thereby further causing magnetic particle-loaded PIPs templates to collect on the interior side of the tube and be drawn downward as a result of magnetic attractive forces of the magnets 510. At the lower-most position (FIG. 11C), the surface of the guide member 508 is orthogonal relative to the longitudinal axis of each aperture and the magnets 510 are a farther distance from the plurality of apertures.

As shown, a plurality of apertures 504 are arranged in a row on the platform 502 and the plurality of magnets 510 are arranged in a corresponding row on the guide member 508, wherein each of the plurality of magnets corresponds to a separate one of the plurality of apertures. Furthermore, each of the plurality of magnets is substantially aligned with the corresponding aperture. Accordingly, when a tube is received and retained within an aperture, a corresponding magnet is positioned adjacent to a bottom of the tube when the magnetic assembly is in the lower-most position and positioned adjacent to a side portion of the tube when the magnetic assembly is in the upper-most position. As such, when the magnetic assembly is in the upper-most position, magnetic particles within a tube are attracted to a sidewall of the tube due to magnetic attractive forces, and when the magnetic assembly is in the lower-most position, magnetic particles within a tube are attracted to a bottom of the tube due to magnetic attractive forces. As shown in FIGS. 11A, 111B, and 11C, when the magnetic assembly 506 transitions from the upper-most position to the lower-most position, magnetic particles within a tube correspondingly move from a sidewall of the tube toward a bottom of the tube due to magnetic attractive forces.

As previously described, the magnetic assembly 506 is configured to move both vertically and horizontally relative to the platform, and specifically relative to the tubes. As shown in FIG. 10, the platform 502 comprises opposing sidewalls, each sidewall comprising a corresponding slot 514 for guiding the magnetic assembly 506 between the upper-most and lower-most positions. In particular, the guide member 508 is positioned between the opposing sidewalls and comprises support members 512 extending through the corresponding slots 514 on the opposing sidewalls. For example, the slots are L-shaped.

The platform 502 further includes a wall member that comprises one or more magnets 516 provided thereon. The magnetic assembly is releasably maintained in the upper-most position due to magnetic attractive forces between the one or more magnets 516 of the wall member in the platform and one or more magnets 510 of the magnetic assembly 506.

In some embodiments, the magnets are permanent magnets. For example, the magnets may be rare earth magnets. In other embodiments, the magnets are electromagnets. The electromagnets may be operably coupled to one or more timers such that one or more magnetic fields are produced in an automated fashion based, at least in part, on said one or more timers.

After agitation of the sample with the PIPs templates (e.g., vortexing), a plurality (e.g., thousands, tens of thousands, hundreds of thousands, one million, two million, ten million, or more) of aqueous partitions is formed simultaneously inside the tube. Vortexing causes the fluids to partition into a plurality of monodisperse droplets. A substantial portion of droplets will contain a single template particle and a single cell. Droplets containing more than one or none of a template particle or target cell can be removed, destroyed, or otherwise ignored.

The next steps in the workflow involves lysing the single cells and capturing released mRNA inside the partitions. First-strand cDNA is then generated via reverse transcription (RT) and amplified to create a cDNA library for each individual cell. These are then processed into sequencing libraries using standard library preparation methods and subsequently sequenced and analyzed. Such processes generally involve, and require, careful sample handling and manipulation of the multiphase samples, including washing and fluid handling. Recognizing the difficulties technicians face with standard hand-held liquid handling pipettors, the present invention provides a sample tube holder, generally in the form of a guide rack, that incorporates certain visual aids to enable precise removal of excess volume in washing and fluid handling steps. In particular, the guide rack includes a plurality of slots or apertures configured to receive and releasably retain sample tubes therein, and further includes a visual guide rod positioned relative to each slot or aperture.

The visual guide rod may be at a fixed position that corresponds to a particular volume at which excess fluid can be removed from a given tube. Accordingly, the guide rack improves the ease with which a technician can work with the sample tubes, particularly during washing and fluid handling steps.

It should be noted that certain steps (including washing steps) may further require the use of a centrifuge. For example, centrifuging a sample tube prior to performing PCR ensures that all reactants are in the bottom of the tube for proper concentrations and improved yields. A common issue encountered with a standard benchtop centrifuge is that sample tubes sit at a fixed and angled position, which results in the formation of a slanted pellet within the tube, which is not optimal. Some centrifuges have been developed that are configured to receive microwell plates (i.e., typically 96-, 384-, or 1536-well plates) and swing the wells into a horizontal position during operation, thereby concentrating the resulting pellet into the well bottoms. However, such centrifuges (also referred to as microplate microcentrifuges) are limited to receiving microwell plates and are unable to accept individual sample tubes.

Figure 12:
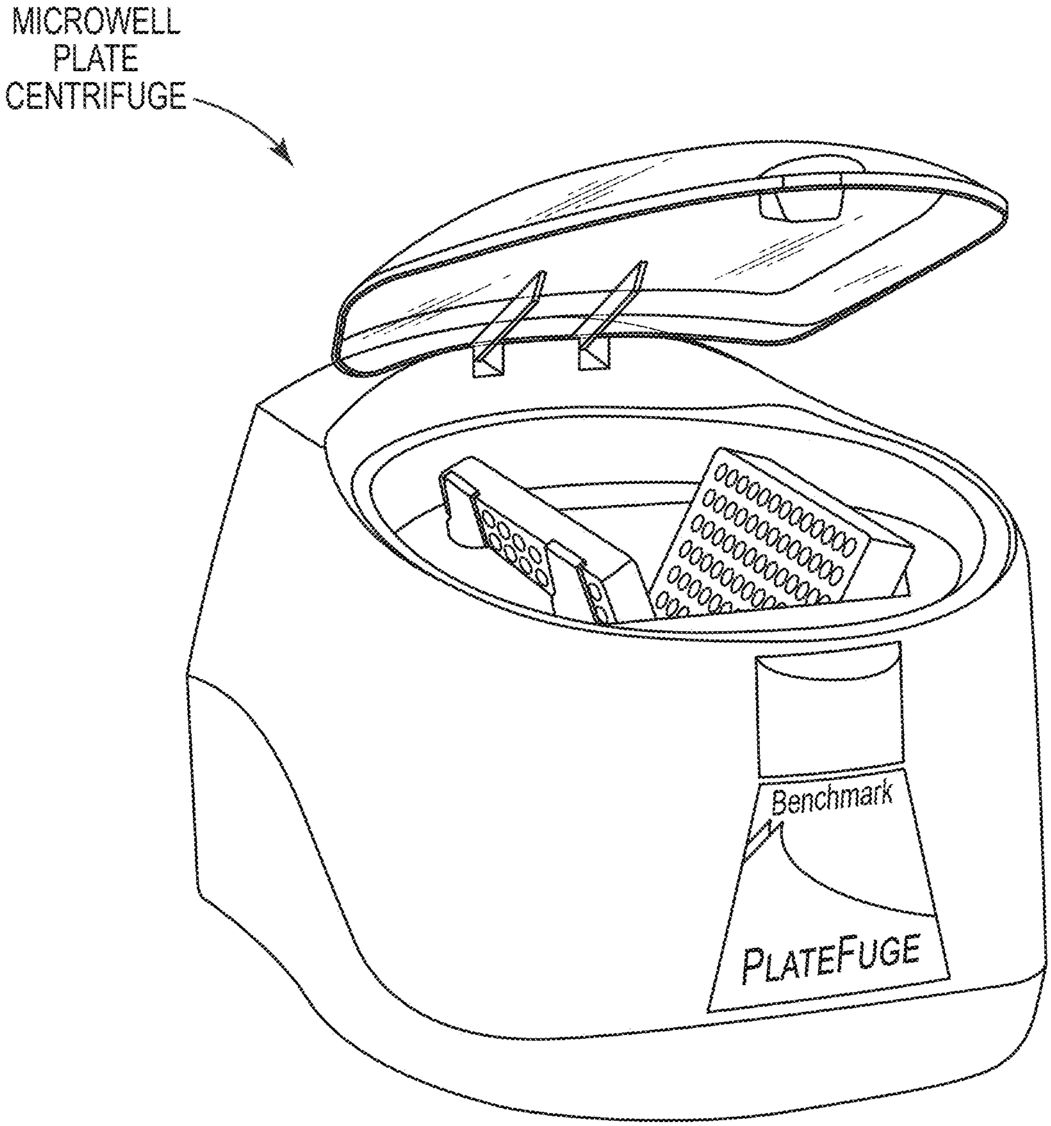
FIG. 12 shows an exemplary microcentrifuge configured to receive microwell plates.
Figure 13:
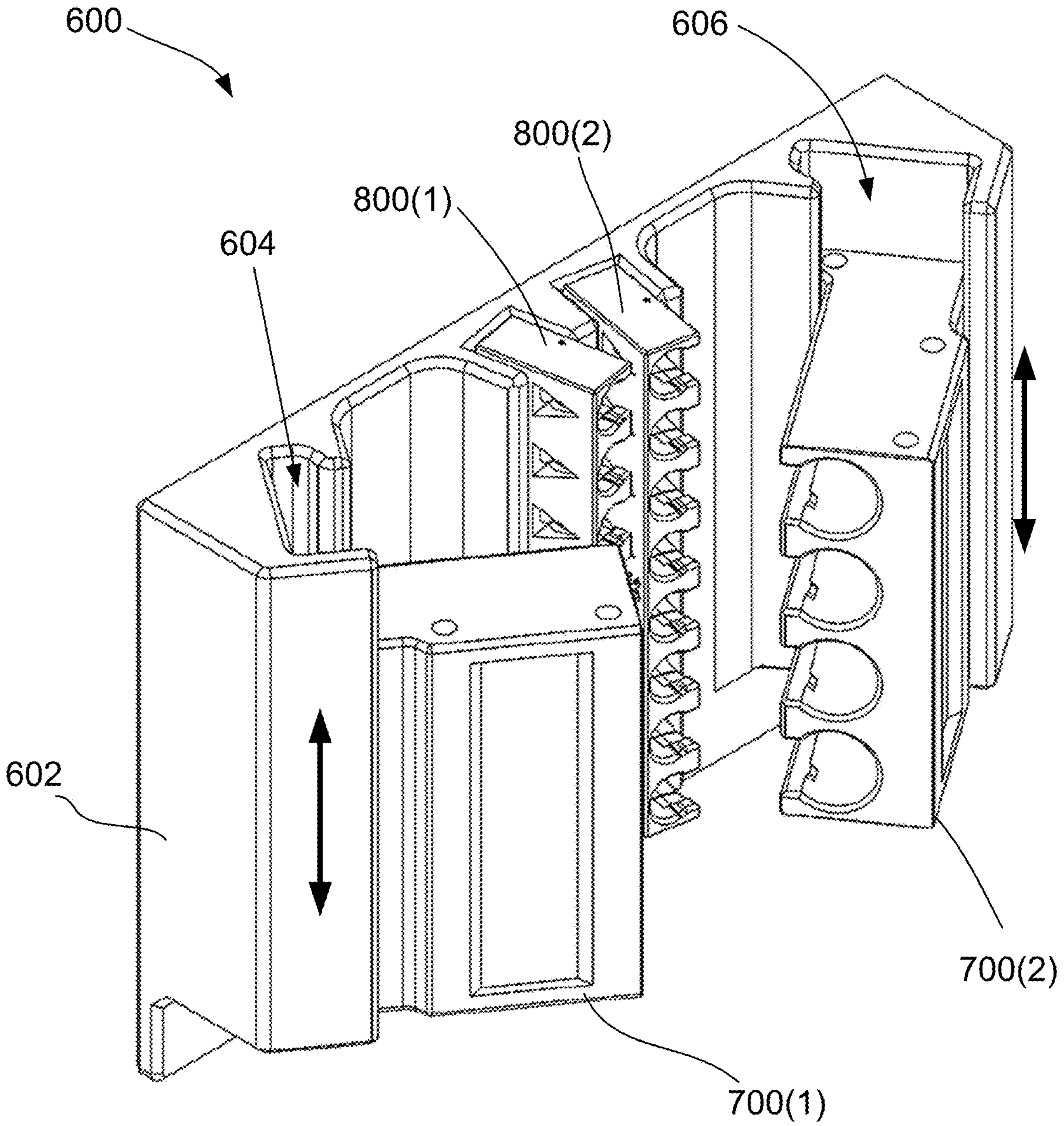
FIG. 13 shows an exemplary embodiment of a centrifuge adapter device capable of holding individual sample tubes and/or strip tube configurations and further configured to be loaded into a microwell plate holder of a microcentrifuge.

The present invention provides a centrifuge adapter allowing for standard benchtop microwell plate centrifuges to accommodate individual sample tubes and/or strip tube configurations. FIG. 12 shows an exemplary microcentrifuge configured to receive microwell plates. FIG. 13 shows an exemplary embodiment of a centrifuge adapter device 600 capable of holding individual sample tubes and/or strip tube configurations and further configured to be loaded into a microwell plate holder of a microcentrifuge, such as the microcentrifuge of FIG. 12.

As shown, the adapter 600 is shaped and/or sized to fit within a microwell plate holder of a microcentrifuge and support individual tubes, such as sample tubes (i.e., 0.5 mL, 1.5 mL, 2 mL, etc., tubes) held via tube holders 700(1) and 700(2) and sets of strip tubes (e.g., 0.2 mL tubes in a strip) held via holders 800(1) and 800(2). In particular, the adapter 600 includes a base portion 602 that has an exterior profile matching that of a microwell plate, thereby allowing for the base portion to be placed within a microwell plate holder of a microcentrifuge. The base portion 602 is configured to receive and releasably retain sample tube holders thereto. In particular, the base portion 602 includes multiple recesses shaped and/or sized to receive and retain portions of sample tube holders thereto. For example, in one embodiment, the base portion 602 may include a recess 604, 606 defined on each end thereof in which portions of respective sample tube holders 700(1), 700(2) may be received and retained. For example, a first tube holder 700(1) and a second tube holder 700(2) may be configured to be releasably coupled to the base portion 602 via engagement between respective portions of the first and second tube holders and corresponding first and second recesses 604, 606.

Figure 14:
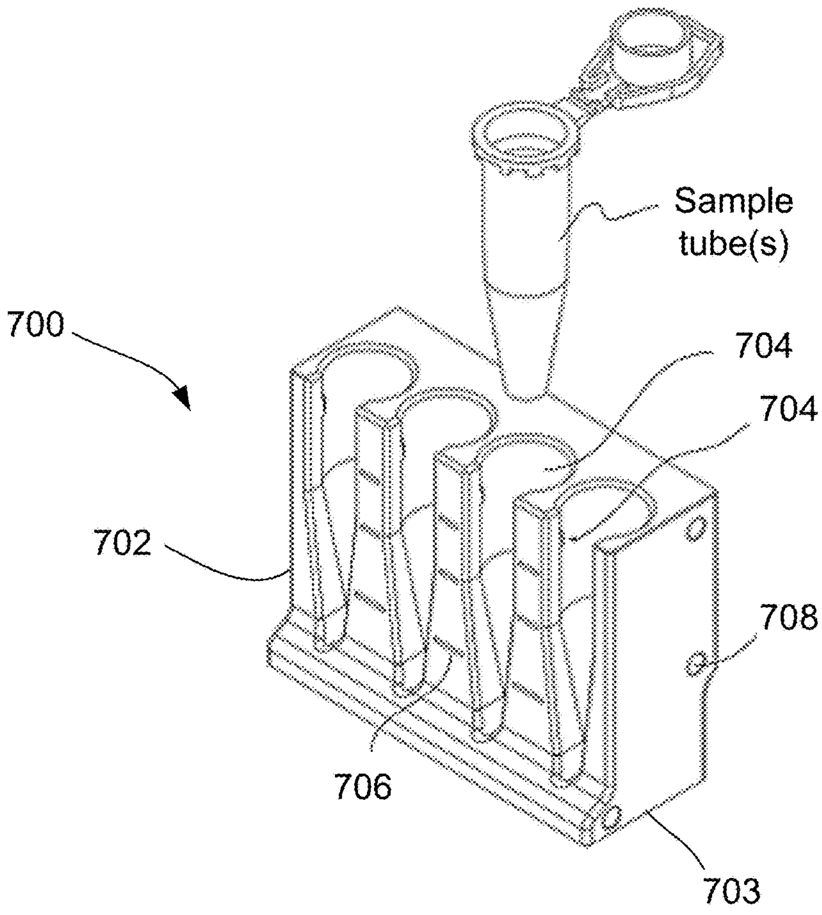
FIG. 14 shows an individual sample tube holder capable of releasably coupling to a corresponding portion of the centrifuge adapter device.

FIG. 14 shows an individual sample tube holder 700 capable of releasably coupling to a corresponding portion of the centrifuge adapter device. For example, a given sample tube holder 700 includes a frame 702 including apertures 704 for receiving sample tubes within (i.e., 0.5 mL, 1.5 mL, 2.0 mL Eppendorf tubes). As shown, a portion of the frame (703) is shaped and/or sized to be received within at least one of the first and second recesses 604, 606 formed in the base portion 602. The frame 702 further comprises one or more gradation lines or other visual indicia 706 adjacent to the apertures 704 for providing a technician with a visual indication of fill volumes when tubes are placed within the apertures.

Figure 15:
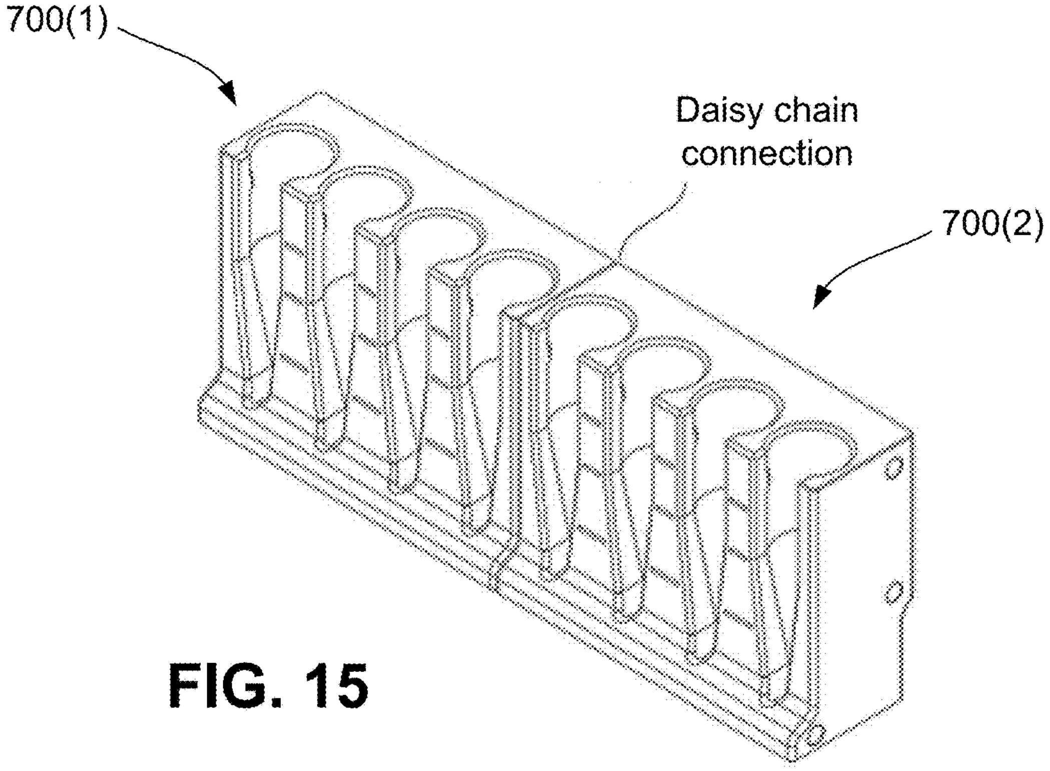
FIG. 15 illustrates coupling of two sample tube holders to one another via a connection mechanism, such as a magnetic connection, thereby forming a daisy chain arrangement.

In some embodiments, each sample tube holder may be configured to releasably attach to another sample tube holder via magnets 708 or other connecting means that are integrated into sides of the sample tube holder, to thereby arrange the sample tubes in a row. This is specifically shown in FIG. 15, which illustrates coupling of two sample tube holders to one another via a connection mechanism, such as a magnetic connection, thereby forming a daisy chain arrangement.

Figure 16:
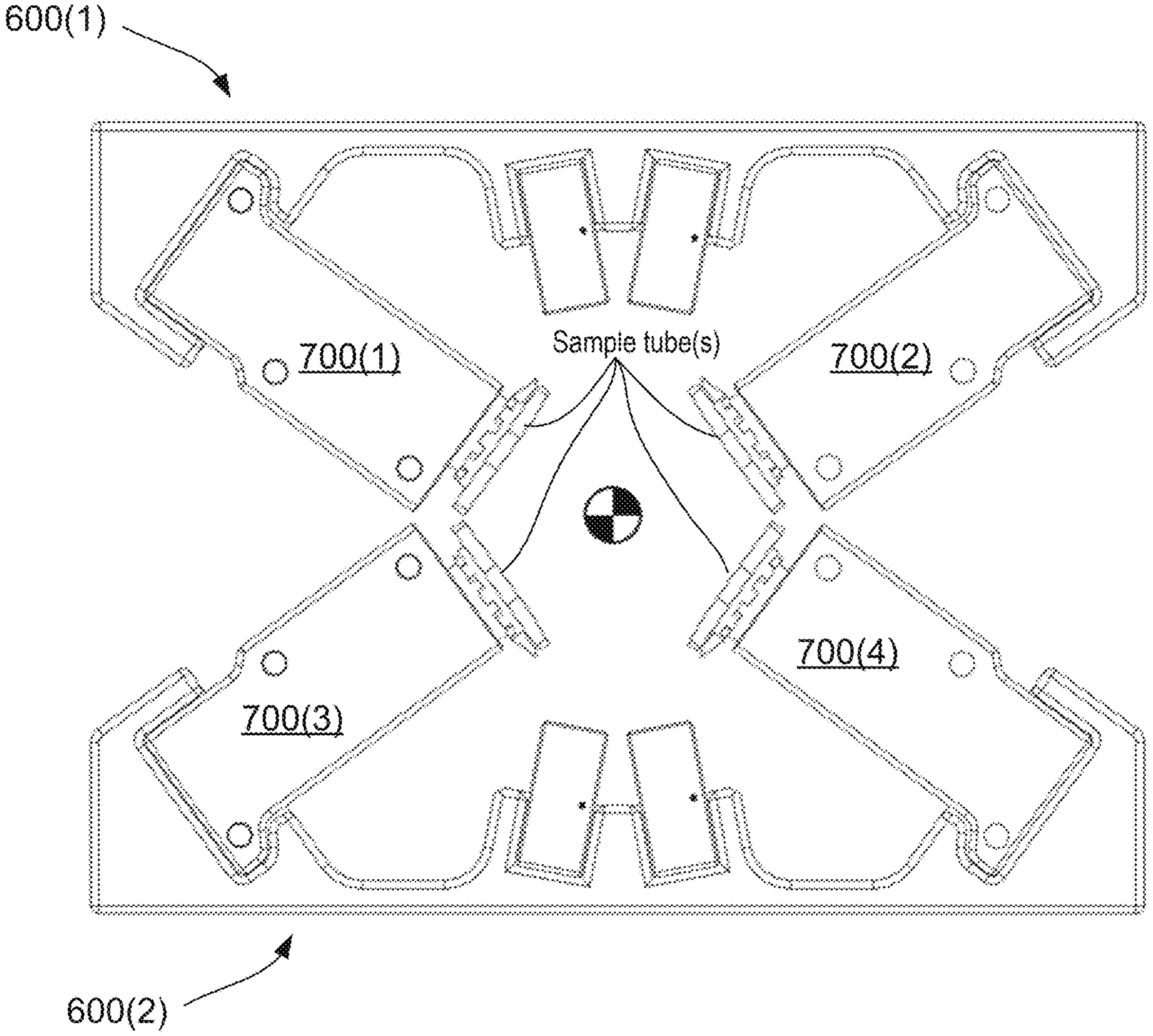
FIG. 16 is a plan view illustrating a pair of centrifuge adapter devices in a loaded arrangement (i.e., coupled to corresponding microwell plate holders) within a microcentrifuge and assembled with sample tube holders and corresponding sample tubes positioned in a horizontal orientation.

When assembled, the base portion 602 comprises the first and second tube holders 700(1), 700(2) releasably coupled thereto and the apertures 704 on the frame 702 are oriented in a substantially horizontal direction. For example, FIG. 16 is a plan view illustrating a pair of centrifuge adapter devices 600(1), 600(2) in a loaded arrangement (i.e., coupled to corresponding microwell plate holders) within a microcentrifuge and assembled with sample tube holders 700(1), 700(2), 700(3), and 700(4) and corresponding sample tubes positioned in a horizontal orientation. As shown, the bottom of a tube is facing in an outward direction and the top of a tube is facing an inward direction. Accordingly, operation of the centrifuge will result in a substantially level, and more concentrated, pellet to form in the bottom of the tubes. Accordingly, the centrifuge adapter is able to adapt various sample tube formats to a common microplate microcentrifuge, which was previously limited to only accepting microwell plates.

Figure 17:
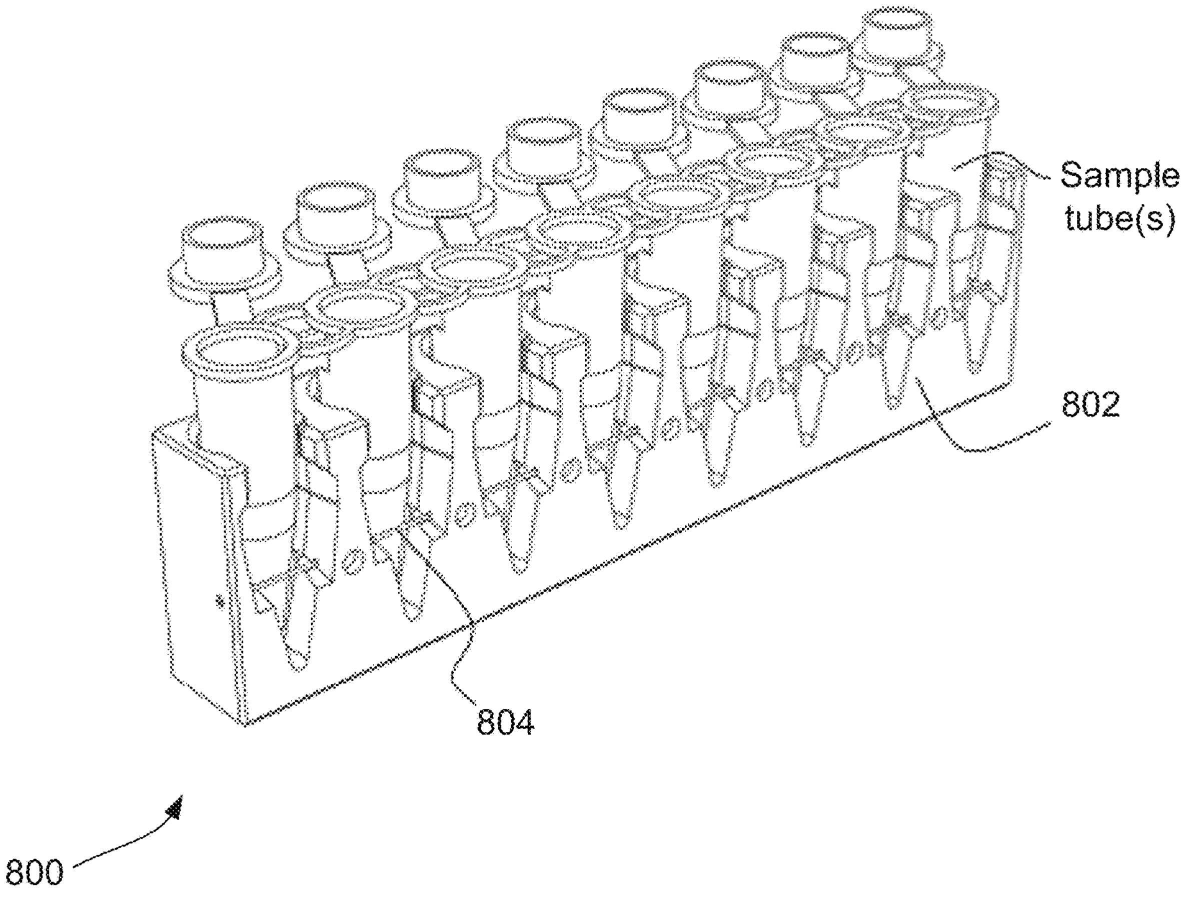
FIG. 17 shows an exemplary embodiment of a guide rack for holding sample tubes, generally in the form of a strip of sample tubes. The guide rack is compatible for use with the centrifuge adapter device, as illustrated in FIG. 13.

FIG. 17 shows an exemplary embodiment of a guide rack 800 for holding sample tubes, generally in the form of a strip of sample tubes. The guide rack is compatible for use with the centrifuge adapter device 600, as illustrated in FIG. 13. The guide rack 800 includes a plurality of slots or apertures provided in a base 802 and configured to receive and releasably retain sample tubes therein, and further includes a visual guide rod 804 positioned relative to each slot or aperture. The visual guide rod may be at a fixed position that corresponds to a particular volume at which excess fluid can be removed from a given tube. Accordingly, the guide rack improves the ease with which a technician can work with the sample tubes, particularly during washing and fluid handling steps.

Accordingly, the devices of the present invention improve upon protocol compliance, reproducibility, and sensitivity, particularly in single-cell sequencing assays. Such devices are tailored to single-cell RNA sequencing assays that utilize PIPs and will ultimately improve the manner with which a medical technologist (or other lab personnel) can carry out the various sample preparation steps involved in ScRNA-Seq using PIPs templates, thereby reducing overall time required in performing a given assay and further reducing the risk of inaccurate diagnoses.

INCORPORATION BY REFERENCE

References and citations to other documents, such as patents, patent applications, patent publications, journals, books, papers, web contents, have been made throughout this disclosure. All such documents are hereby incorporated herein by reference in their entirety for all purposes.

EQUIVALENTS

Various modifications of the invention and many further embodiments thereof, in addition to those shown and described herein, will become apparent to those skilled in the art from the full contents of this document, including references to the scientific and patent literature cited herein.

The subject matter herein contains important information, exemplification and guidance that can be adapted to the practice of this invention in its various embodiments and equivalents thereof.

The invention claimed is:

1. A vortex adapter configured for use with a vortex mixer, said adapter comprising:

a base comprising a proximal portion releasably couplable to a hub of a vortex mixer; and a tube holder releasably mounted to a distal portion of the base and comprising a plurality of apertures for receiving a plurality of tubes, respectively, wherein said tube holder is movable between a fixed first position in which the tube holder is releasably mounted to the distal portion of the base such that each of said apertures is oriented in a vertical direction relative to the base and a second fixed position in which the tube holder is releasably mounted to the distal portion of the base such that each of said apertures is oriented in a horizontal direction relative to the base.

2. The vortex adapter of claim 1, wherein each of the plurality of apertures is shaped and/or sized to retain a respective tube therein and configured to subject any tube therein to vortex forces from a vortex mixer.

3. The vortex adapter of claim 2, wherein the apertures are shaped and/or sized to receive and retain a tube comprising of volume of between 0.1 mL and 5 mL.

4. The vortex adapter of claim 2, wherein, when the tube holder is in the first position, each of the apertures retains a respective tube received therein in a vertical direction.

5. The vortex adapter of claim 4, wherein a longitudinal axis of each tube is orthogonal relative to a surface upon which a vortex mixer is placed.

6. The vortex adapter of claim 4, wherein, when the tube holder is in the first position, tubes received and retained within respective apertures are subjected to vertical vortexing upon receipt of vortex forces from the vortex mixer.

7. The vortex adapter of claim 2, wherein, when the tube holder is in the second position, each of the apertures retains a respective tube received therein in a horizontal direction.

8. The vortex adapter of claim 7, wherein a longitudinal axis of each tube is parallel relative to a surface upon which a vortex mixer is placed.

9. The vortex adapter of claim 7, wherein, when the tube holder is in the second position, tubes received and retained within respective apertures are subjected to horizontal vortexing upon receipt of vortex forces from the vortex mixer.

10. The vortex adapter of claim 1, wherein the tube holder comprises at least a first set of apertures arranged in a row.

11. The vortex adapter of claim 10, wherein the tube holder comprises a single set of apertures arranged in a row and provided on one side of the tube holder.

12. The vortex adapter of claim 11, wherein the tube holder comprises one or more counterweights provided on an opposing side of the tube holder for balancing inertial forces upon receipt of vortex forces from the vortex mixer.

13. The vortex adapter of claim 10, wherein the tube holder comprises two sets of apertures, each set arranged in a separate room and provided on opposing sides of the tube holder.

14. The vortex adapter of claim 1, further comprising a connection member provided at the distal portion of the base and selectively moveable between an engaged position and a disengaged position.

15. The vortex adapter of claim 14, wherein, when in the engaged position, the connection member maintains the tube holder in one of the first and second positions.

16. The vortex adapter of claim 15, wherein, when in the disengaged position, the tube holder is moveable between the first and second positions.

17. The vortex adapter of claim 14, wherein the distal portion of the base comprises two knuckle members defining a channel therebetween.

18. The vortex adapter of claim 17, wherein the connection member comprises an adjustable bolt assembly extending between the knuckle members and configured to draw the knuckle members together upon movement of the bolt assembly to the engaged position.

19. The vortex adapter of claim 18, wherein the tube holder comprises a body portion sized to fit within the channel in either of the first and second positions.

20. The vortex adapter of claim 19, wherein, when in the engaged position, the connection member causes the knuckle members to apply a retention force upon the body portion of the tube holder and prevent movement thereof within the channel.

* * * * *